United States Patent
Lee et al.

(10) Patent No.: US 9,794,320 B2
(45) Date of Patent: Oct. 17, 2017

(54) METHOD AND APPARATUS FOR PROVIDING WEB SERVICE IN WIRELESS COMMUNICATION SYSTEM

(71) Applicant: Samsung Electronics Co., Ltd, Gyeonggi-do (KR)

(72) Inventors: Chul-Ki Lee, Seoul (KR); Sang-Jun Moon, Seoul (KR); Yong-Seok Park, Seoul (KR)

(73) Assignee: Sasmsung Electronics Co., Ltd., Suwon-si, Gyeonggi-do (KR)

( * ) Notice: Subject to any disclaimer, the term of this patent is extended or adjusted under 35 U.S.C. 154(b) by 840 days.

(21) Appl. No.: 14/076,063

(22) Filed: Nov. 8, 2013

(65) Prior Publication Data
US 2014/0136604 A1    May 15, 2014

(30) Foreign Application Priority Data
Nov. 9, 2012 (KR) .................. 10-2012-0126859

(51) Int. Cl.
| H04L 29/08 | (2006.01) |
| H04W 4/18 | (2009.01) |
| H04W 52/02 | (2009.01) |
| H04W 76/04 | (2009.01) |

(52) U.S. Cl.
CPC .......... *H04L 67/02* (2013.01); *H04L 67/2842* (2013.01); *H04L 67/325* (2013.01); *H04W 4/18* (2013.01); *H04W 52/0216* (2013.01); *H04W 52/0225* (2013.01); *H04W 76/048* (2013.01); *Y02B 60/50* (2013.01)

(58) Field of Classification Search
CPC .................. H04W 76/048; H04L 67/02
See application file for complete search history.

(56) References Cited

U.S. PATENT DOCUMENTS

| 6,820,116 | B1 * | 11/2004 | Pyhalammi | ....... G06F 17/30902 707/E17.12 |
| 6,941,310 | B2 * | 9/2005 | Ahad | .................. G06F 17/3048 |
| 7,058,691 | B1 * | 6/2006 | Yu | ...................... H04L 67/2847 455/456.3 |

(Continued)

FOREIGN PATENT DOCUMENTS

| EP | 1398715 A3 | 3/2004 |
| EP | 2398210 A1 | 12/2011 |

(Continued)

OTHER PUBLICATIONS

International Search Report dated Feb. 26, 2014 in connection with International Patent Application No. PCT/KR2013/010131, 3 pages.

(Continued)

*Primary Examiner* — Lashonda Jacobs

(57) ABSTRACT

In a wireless communication system, a mobile terminal providing a web service receives information about a web page for a web service from a mobile terminal, receives at least one embedded object included in the web page from a web server, sets a Discontinuous Reception (DRX) interval for the mobile terminal based on a size of the at least one embedded object, transmits information about the set DRX interval to the mobile terminal, and transmits the at least one embedded object to the mobile terminal at a time the set DRX interval ends.

16 Claims, 17 Drawing Sheets

(56) References Cited

U.S. PATENT DOCUMENTS

| | | | |
|---|---|---|---|
| 8,583,191 B2* | 11/2013 | Iwamura | H04W 52/0225 |
| | | | 370/311 |
| 8,649,816 B2* | 2/2014 | Song | H04W 52/0245 |
| | | | 370/252 |
| 9,282,480 B2* | 3/2016 | Matsuoka | H04W 24/08 |
| 9,491,702 B2* | 11/2016 | Dai | H04W 16/10 |
| 2008/0052366 A1 | 2/2008 | Olsen et al. | |
| 2008/0101268 A1* | 5/2008 | Sammour | H04W 76/048 |
| | | | 370/311 |
| 2009/0219844 A1 | 9/2009 | Soliman | |
| 2011/0093610 A1 | 4/2011 | Rezaiifar et al. | |
| 2011/0249571 A1* | 10/2011 | Das | H04W 88/182 |
| | | | 370/252 |
| 2011/0314121 A1 | 12/2011 | Navda et al. | |
| 2013/0128788 A1* | 5/2013 | Guey | H04W 76/048 |
| | | | 370/311 |
| 2014/0098778 A1* | 4/2014 | Valentin | H04W 4/001 |
| | | | 370/329 |
| 2014/0334371 A1* | 11/2014 | Kim | H04W 52/0206 |
| | | | 370/311 |
| 2015/0131505 A1* | 5/2015 | Dai | H04W 16/10 |
| | | | 370/311 |

FOREIGN PATENT DOCUMENTS

| | | |
|---|---|---|
| EP | 2469789 A1 | 6/2012 |
| WO | WO 2011/116819 A1 | 9/2011 |
| WO | WO 2012/037332 A1 | 3/2012 |

OTHER PUBLICATIONS

Written Opinion of the International Searching Authority dated Feb. 26, 2014 in connection with International Patent Application No. PCT/KR2013/010131, 5 pages.

Partial Supplementary European Search Report dated May 18, 2016 in connection with European Application No. 13853403.7, 6 pages.

* cited by examiner

METHOD AND APPARATUS FOR PROVIDING WEB SERVICE IN WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) of a Korean patent application No. 10-2012-0126859 filed in the Korean Intellectual Property Office on Nov. 9, 2012, the entire disclosure of which is incorporated herein by reference.

TECHNICAL FIELD

The present disclosure relates to a method and apparatus for providing a web service in a wireless communication system.

BACKGROUND

The development of wireless communication technology has caused an increase in the use of Social Networking Service (SNS), web surfing, and content such as movies and music, which are consumed using mobile terminals. In line with the increase in the use of these web-based services, several ways have been proposed to provide more seamless services to users. A way to use a cache server in the wireless communication environment has been proposed as one of the several ways. The cache server may be installed and operated in a base station between a mobile terminal and a web server.

A detailed operation of the cache server will be described as follows. The cache server interprets in advance a web page configured in a Hyper Text Markup Language (HTML) in order to prevent occurrence of cache miss in response to a Hyper Text Transfer Protocol (HTTP) request from a mobile terminal. Based on the interpretation results of the web page, the cache server determines the presence/absence of embedded objects to be transmitted to the mobile terminal. If the embedded objects are present, the cache server downloads the embedded objects from the web server, and stores the downloaded objects. The above-described operation of the cache server may be performed while the mobile terminal interprets the web page.

Upon receiving an HTTP request from the mobile terminal, the cache server sends an HTTP response including the stored embedded objects to the mobile terminal in response to the HTTP request. The cache server may transmit one embedded object to the mobile terminal in response to one HTTP request, or may transmit multiple embedded objects (for example, all or some of the embedded objects included in the web page) to the mobile terminal at once in response to one HTTP request.

The above-described process may contribute to a reduction in the time for which the mobile terminal receives all the embedded objects. However, the mobile terminal requires the time for interpreting received embedded objects and rendering the interpreted objects on the screen. Therefore, if the mobile terminal receives multiple embedded objects at once, the mobile terminal may require more time to render the web page. In the case of a video object, since the video object is configured as a single file, the reception time for embedded objects may not be reduced, even though the above process is performed.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide a method and apparatus for providing a web service in a wireless communication system.

Another aspect of the present disclosure is to provide a method and apparatus for providing a faster web service to a user while minimizing the power consumption of a mobile terminal.

Another aspect of the present disclosure is to provide a method and apparatus for allowing a mobile terminal supporting a web service to efficiently use a Discontinuous Reception (DRX) scheme.

In accordance with an aspect of the present disclosure, there is provided a method for providing a web service by a proxy cache in a wireless communication system. The method includes receiving information about a web page for the web service from a mobile terminal, receiving at least one embedded object included in the web page from a web server, setting a Discontinuous Reception (DRX) interval for the mobile terminal based on a size of the at least one embedded object, and transmitting information about the set DRX interval to the mobile terminal, and transmitting the at least one embedded object to the mobile terminal at a time the set DRX interval ends.

In accordance with another aspect of the present disclosure, there is provided a method for receiving a web service by a mobile terminal in a wireless communication system. The method includes transmitting information about a web page for the web service to a proxy cache, receiving information about a DRX interval from the proxy cache, operating in a sleep mode during the DRX interval; and transitioning from the sleep mode to a listening mode at a time the DRX interval ends, and receiving at least one embedded object included in the web page from the proxy cache. The DRX interval may be set based on a size of the at least one embedded object.

In accordance with further another aspect of the present disclosure, there is provided a proxy cache in a wireless communication system. The proxy cache includes a receiver for receiving information about a web page for a web service from a mobile terminal, and receiving at least one embedded object included in the web page from a web server, a controller for setting a DRX interval for the mobile terminal based on a size of the at least one embedded object, and a transmitter for transmitting information about the set DRX interval to the mobile terminal, and transmitting the at least one embedded object to the mobile terminal at a time the set DRX interval ends.

In accordance with yet another aspect of the present disclosure, there is provided a mobile terminal in a wireless communication system. The mobile terminal includes a transmitter for transmitting information about a web page for a web service to a proxy cache, a receiver for receiving information about a DRX interval from the proxy cache, and a controller for controlling the mobile terminal to operate in a sleep mode during the DRX interval, transitioning from the sleep mode to a listening mode at a time the DRX interval ends, and controlling the receiver to receive at least one embedded object included in the web page from the proxy cache. The DRX interval may be set based on a size of the at least one embedded object.

In accordance with still another aspect of the present disclosure, there is provided a method for providing a web service by a proxy cache in a wireless communication system. The method includes receiving information about a web page for the web service from a mobile terminal, receiving at least one embedded object included in the web page from a web server, determining the number of connections between the proxy cache and the mobile terminal, which are to be used to transmit the at least one embedded object, and transmitting information about the determined number of connections to the mobile terminal, and transmitting the at least one embedded object to the mobile terminal using connections corresponding to the determined number of connections.

In accordance with still another aspect of the present disclosure, there is provided a proxy cache in a wireless communication system. The proxy cache includes a receiver for receiving information about a web page for a web service from a mobile terminal, and receiving at least one embedded object included in the web page from a web server, a controller for determining the number of connections between the proxy cache and the mobile terminal, which are to be used to transmit the at least one embedded object; and a transmitter for transmitting information about the determined number of connections to the mobile terminal, and transmitting the at least one embedded object to the mobile terminal using connections corresponding to the determined number of connections.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The present disclosure provides a method and apparatus for providing a web service in a wireless communication system. Specifically, the present disclosure provides a method and apparatus for providing a web service to a mobile terminal based on wireless channel information in a wireless communication system, and also provides a method and apparatus for allowing the mobile terminal to receive the web service using a Discontinuous Reception (DRX) scheme, thereby making it possible to efficiently use wireless resources and minimize the power consumption of the mobile terminal.

Figure 1:
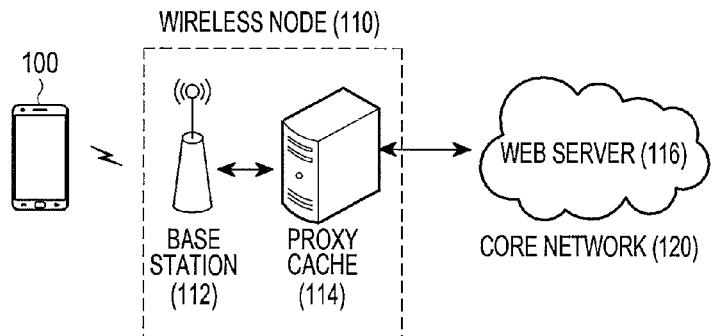
FIG. 1 illustrates a configuration of a wireless communication system according to an exemplary embodiment of the present disclosure.

FIG. 1 illustrates a configuration of a wireless communication system according to an exemplary embodiment of the present disclosure.

Referring to FIG. 1, the wireless communication system may include a mobile terminal 100, a wireless node 110, and a core network 120.

The mobile terminal 100 may be a unit (or device) capable of supporting a web service, such as a cellular phone or a tablet Personal Computer (PC), and may send an HTTP request for requesting the provision of a web service. The HTTP request may include a Uniform Resource Locator (URL) address, HTTP method and parameters, and the like.

The core network 120 may include the Internet and a web server 116. The web server 116, which is included in the Internet, may provide a variety of web services such as web pages, SNS and videos.

The wireless node 110 may include a base station 112 and a proxy cache 114. The base station 112 may be an enhanced Node B (eNB) or a wireless Local Area Network (LAN) Access Point (AP) for a cellular network included in the Long Term Evolution (LTE) system. The proxy cache 114 may store in advance web objects (for example, images, videos, data or the like included in the web page) received from the web server 116, and upon receiving an HTTP request from the mobile terminal 100, the proxy cache 114 may transmit the pre-stored objects to the mobile terminal 100. The pre-stored objects are included in an HTTP response, and the HTTP response may include information about the objects and types of the objects.

Upon occurrence of cache miss (for example, if there are no objects pre-stored in the proxy cache 114, or if the objects requested by the mobile terminal 100 are not present in the proxy cache 114), the proxy cache 114 may send an HTTP request for requesting the provision of the objects, to the core network 120. The proxy cache 114 may receive an HTTP response including the objects from the core network 120, and transmit the objects to the mobile terminal 100.

The base station 112 and the proxy cache 114 may be a logically coupled unit. Therefore, although the base station 112 and the proxy cache 114 are separately illustrated in FIG. 1, the base station 112 and the proxy cache 114 may be incorporated into a single physical unit in the form of a module. The proxy cache 114 may be implemented as a separate unit capable of directly performing communication with the mobile terminal 100, or may be implemented in various ways such as being included in other units.

A DRX scheme may be used to reduce the power consumption of the mobile terminal 100. In the DRX scheme, if there is traffic for the mobile terminal 100, the mobile terminal 100 operates in listening or active mode, and otherwise, the mobile terminal 100 operates in sleep mode. The proxy cache 114 may transmit objects corresponding to an HTTP request in accordance with the DRX scheme, to reduce the power consumption of the mobile terminal 100 and to provide the optimized web service.

Figure 2A:
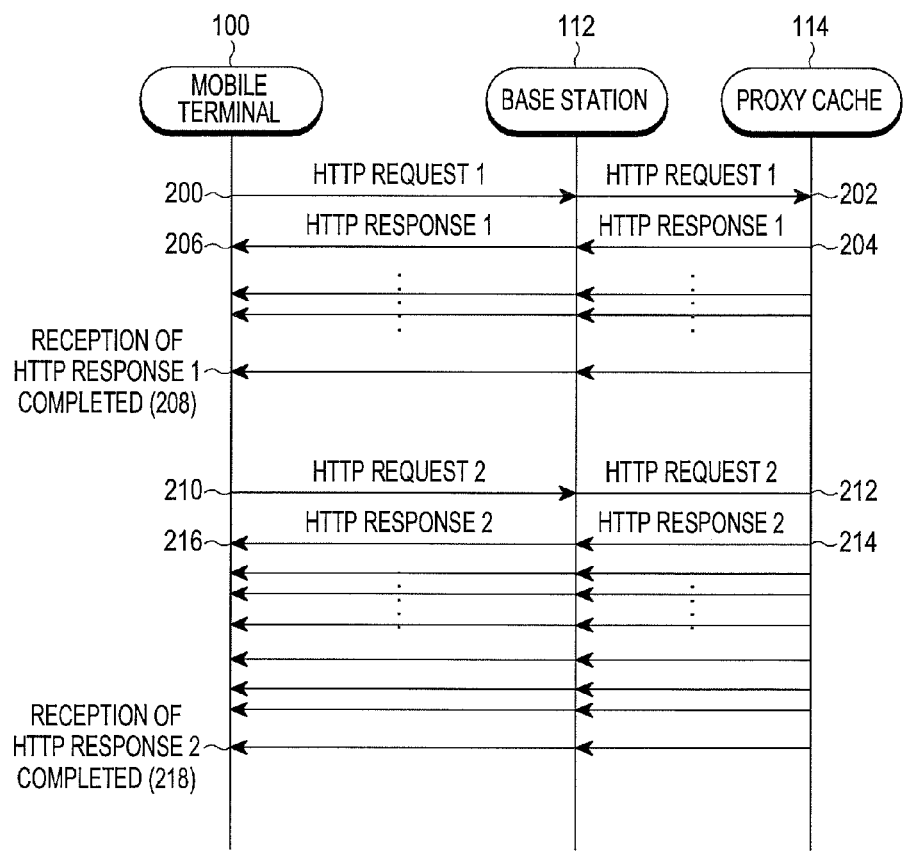
FIG. 2A is a signaling diagram illustrating a process of sending and receiving HTTP requests and responses in a wireless communication system.

If the DRX scheme is not used during the provision of a web service, a process similar to the normal file download process may be performed as illustrated in FIG. 2A.

FIG. 2A is a signaling diagram illustrating a process of sending and receiving HTTP requests and responses in a wireless communication system.

Referring to FIG. 2A, the mobile terminal 100 may send an HTTP request 1 to the base station 112 in step 200. In response, the base station 112 may forward the HTTP request 1 to the proxy cache 114 in step 202, and receive at least one HTTP response 1 from the proxy cache 114 in response to the HTTP request 1 in step 204. In step 206, the base station 112 may send the at least one HTTP response 1 to the mobile terminal 100.

For one HTTP request, at least one HTTP response thereto may be sent to the mobile terminal 100. For example, if the HTTP request 1 is an HTTP request for requesting a small-sized image file, the image file may be transmitted to the mobile terminal 100 by being included in one HTTP response. On the contrary, if the HTTP request 1 is an HTTP request for requesting a large-volume video file, the video file may be transmitted to the mobile terminal 100 by being included in multiple HTTP responses. The video file may be included in multiple HTTP responses in the form of a segment after being fragmented.

If the reception of the at least one HTTP response 1 is completed in step 208, the mobile terminal 100 may send an HTTP request 2 to the base station 112 in step 210. Similarly, the base station 112 may forward the HTTP request 2 to the proxy cache 114 in step 212, and receive at least one HTTP response 2 from the proxy cache 114 in response to the HTTP request 2 in step 214. In step 216, the base station 112 may send the at least one HTTP response 2 to the mobile terminal 100. The reception of the at least one HTTP response 2 may be completed in step 218.

If the general DRX scheme is used in a wireless communication system where the process of FIG. 2A is performed, the base station 112 may send and receive HTTP requests and responses based on a preset one DRX interval because the base station 112 has no information about the characteristics of the ongoing object or file transmission. Details about this will be described in detail below with reference to FIG. 2B.

Figure 2B:
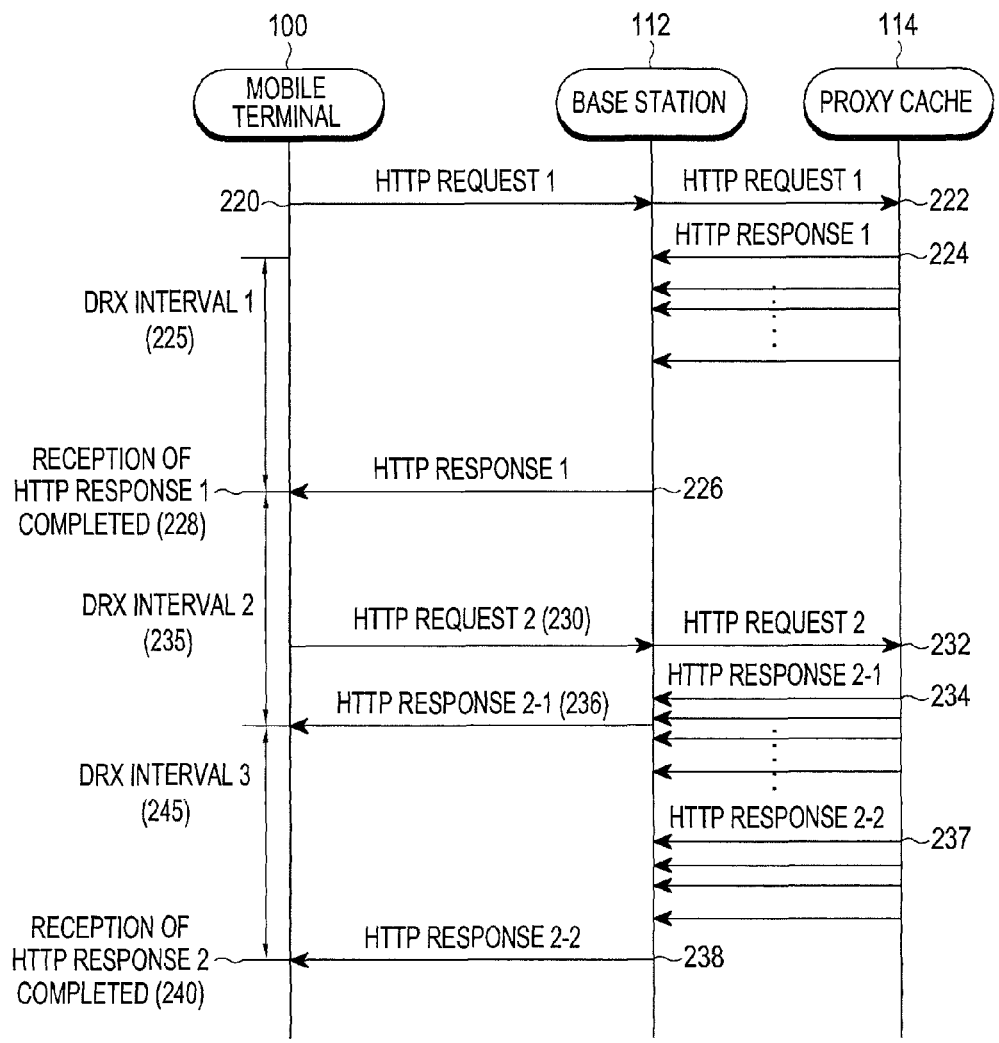
FIG. 2B is a signaling diagram illustrating a process of sending and receiving HTTP requests and responses using a DRX scheme in a wireless communication system.

FIG. 2B is a signaling diagram illustrating a process of sending and receiving HTTP requests and responses using a DRX scheme in a wireless communication system.

Referring to FIG. 2B, the mobile terminal 100 may send an HTTP request 1 to the base station 112 in step 220. In response, the base station 112 may forward the HTTP request 1 to the proxy cache 114 in step 222, and receive at least one HTTP response 1 from the proxy cache 114 in response to the HTTP request 1 in step 224. In step 226, the base station 112 may send the at least one HTTP response 1 to the mobile terminal 100 at the time 228 at which a first DRX interval 225 ends. This is because the mobile terminal 100, which is operating in sleep mode during the DRX interval, wakes up and operates in listening mode at the time the DRX interval ends.

If the same Transmission Control Protocol (TCP) connections are continuously used, an HTTP request 2 needs to be sent after the reception of the at least one HTTP response 1 is completed. The reason is that if the HTTP request 2 is sent before the reception of the at least one HTTP response 1 is completed in the mobile terminal 100, some of the at least one HTTP response 1 may be mixed with some of at least one HTTP response 2, so the file may not be restored.

Accordingly, the mobile terminal 100 may send an HTTP request 2 to the base station 112 in step 230 after the reception of the at least one HTTP response 1 is completed. In response, the base station 112 may forward the HTTP request 2 to the proxy cache 114 in step 232, and receive at least one HTTP response 2-1 from the proxy cache 114 in response to the HTTP request 2 in step 234.

However, as shown in step 237, an HTTP response 2-2 may be sent from the proxy cache 114 as another response to the HTTP request 2 in a third DRX interval 245 after the time at which a second DRX interval 235 ends. In this case, the mobile terminal 100 may receive the HTTP response 2-2 in step 238. As a result, the mobile terminal 100 may not receive the entire response to the HTTP request 2 until the time 240 at which the third DRX interval 245 ends. Due to this situation, transmission of an HTTP request 3 succeeding the HTTP request 2 may be delayed, and because the fixed DRX interval is used, the mobile terminal 100 needs to receive HTTP responses at regular intervals at all times.

To solve this problem, an exemplary embodiment of the present disclosure provides a way to dynamically use a DRX interval based on the size or the like of the object (or file) to be provided to the mobile terminal.

Figure 3:
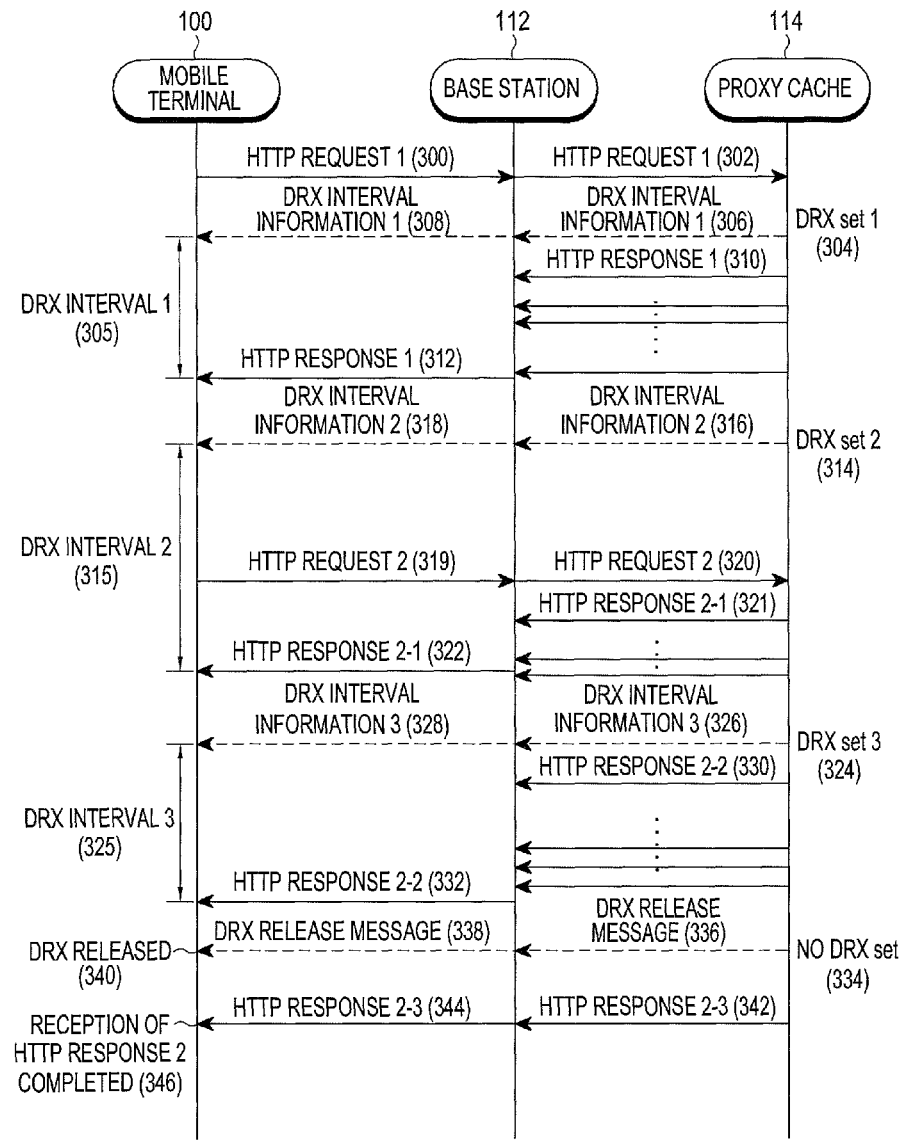
FIG. 3 is a signaling diagram illustrating a process of sending and receiving HTTP requests and responses using a DRX scheme in a wireless communication system according to an exemplary embodiment of the present disclosure.

FIG. 3 is a signaling diagram illustrating a process of sending and receiving HTTP requests and responses using a DRX scheme in a wireless communication system according to an exemplary embodiment of the present disclosure.

Referring to FIG. 3, the mobile terminal 100 may send an HTTP request 1 to the base station 112 in step 300. In response, the base station 112 may send the HTTP request 1 to the proxy cache 114 in step 302. The proxy cache 114 may determine the size of the object requested by the mobile terminal 100 by receiving in advance objects corresponding to the HTTP request 1 from the web server 116. Therefore, based on the size of the object requested by the mobile terminal 100, the proxy cache 114 may estimate the time at which reception of at least one HTTP response 1 to the HTTP request 1 is completed in the mobile terminal 100.

Accordingly, the proxy cache 114 may set a first DRX interval 305 taking into account the estimated time, in step 304 (DRX set 1). For example, the proxy cache 114 may set the first DRX interval 305 such that the estimated time may correspond to the end time of the first DRX interval 305.

In step 306, the proxy cache 114 may transmit information about the set first DRX interval 305 to the base station 112. In step 308, the base station 112 may forward the information about the first DRX interval 305 to the mobile terminal 100.

The information about the set first DRX interval 305 may include first DRX timer information for the first DRX interval 305. Accordingly, the mobile terminal 100 may operate in sleep mode for the time corresponding to the first DRX timer information. Specifically, upon receiving the information about the first DRX interval 305, the mobile terminal 100 may activate the first DRX timer, and operate in the sleep mode until the first DRX timer expires.

In step 310, the proxy cache 114 may send at least one HTTP response 1 to the base station 112. In step 312, the base station 112 may send the at least one HTTP response 1 to the mobile terminal 100. The base station 112 may send the at least one HTTP response 1 to the mobile terminal 100 at the time the first DRX interval 305 ends, taking into account the time corresponding to the first DRX interval 305.

If the first DRX interval 305 ends, the proxy cache 114 may determine that the mobile terminal 100 is in the idle state after receiving all of the at least one HTTP response 1. In step 314, the proxy cache 114 may set a second DRX interval 315 being longer than the first DRX interval 305 (DRX set 2). In step 316, the proxy cache 114 may transmit information about the set second DRX interval 315 to the base station 112. In step 318, the base station 112 may transmit the information about the second DRX interval 315 to the mobile terminal 100.

The information about the set second DRX interval 315 may include second DRX timer information for the second DRX interval 315. Accordingly, the mobile terminal 100 may operate in sleep mode for the time corresponding to the second DRX timer information. Specifically, upon receiving the information about the second DRX interval 315, the mobile terminal 100 may activate the second DRX timer, and operate in the sleep mode until the second DRX timer expires.

During the second DRX interval 315, the mobile terminal 100 may send an HTTP request 2 to the base station 112 in step 319. In response, the base station 112 may forward the HTTP request 2 to the proxy cache 114 in step 320. In step 321, the proxy cache 114 may send at least one HTTP response 2-1 to the base station 112 in response to the HTTP request 2. In step 322, the base station 112 may send the at least one HTTP response 2-1 to the mobile terminal 100 at the time the second DRX interval 315 ends. It will be assumed in FIG. 3 that a response to the HTTP request 2 is sent by being fragmented into HTTP responses 2-1, 2-2 and 2-3.

There may be some HTTP responses to be sent to the mobile terminal 100, even after the second DRX interval 315 ends. In this case, the proxy cache 114 may set a third DRX interval 325 based on the size of the objects to be transmitted to the mobile terminal 100 in step 324 (DRX set 3). In step 326, the proxy cache 114 may transmit information about the third DRX interval 325 to the base station 112. In step 328, the base station 112 may transmit the information about the third DRX interval 325 to the mobile terminal 100.

The information about the set third DRX interval 325 may include third DRX timer information for the third DRX interval 325. Accordingly, the mobile terminal 100 may operate in sleep mode for the time corresponding to the third DRX timer information. Specifically, upon receiving the information about the third DRX interval 325, the mobile terminal 100 may activate the third DRX timer, and operate in the sleep mode until the third DRX timer expires.

In step 330, the proxy cache 114 may send an HTTP response 2-2 to be sent to the mobile terminal 100, to the base station 112. In step 332, the base station 112 may send the HTTP response 2-2 to the mobile terminal 100. The base station 112 may send the HTTP response 2-2 to the mobile terminal 100 at the time the third DRX interval 325 ends, taking into account the time corresponding to the third DRX interval 325.

The proxy cache 114 may determine to release the DRX mode in step 334, if there are HTTP responses to be sent to the mobile terminal 100, the number of which is less than a predetermined number, after the third DRX interval 325 ends. Accordingly, the proxy cache 114 may send a DRX release message for instructing to release the DRX mode, to the base station 112 in step 336. In step 338, the base station 112 may send the DRX release message to the mobile terminal 100. Upon receiving the DRX release message, the mobile terminal 100 may release the DRX mode in step 340.

In step 344, the mobile terminal 100 may receive via the base station 112 the last HTTP response 2-3 that the proxy cache 114 sent to the base station 112 in step 342. Then, the mobile terminal 100 may complete the reception of the HTTP response 2 in step 346.

Although it is assumed in FIG. 3 that the DRX interval is set by estimating the time the HTTP response is received, based on the object size, the DRX interval may also be set, taking into account the download speed in the proxy cache 114. Since the DRX interval is set based on the DRX timer, the DRX interval may be set based on the determined DRX timer.

The proxy cache 114 may download a file from the web server 116 and transmit the downloaded file to the mobile terminal 100. If the speed, at which the proxy cache 114 downloads a file from the web server 116, is lower than a preset speed, the time required until the download is completed may increase. Therefore, the proxy cache 114 may set the DRX timer to be greater than or equal to a threshold. In contrast, if the speed, at which the proxy cache 114 downloads a file from the web server 116, is higher than a preset speed, the time required until the download is completed may decrease, so the proxy cache 114 may set the DRX timer to be less than the threshold.

The proxy cache 114 may also set the DRX timer based on the throughput of the mobile terminal 100. For example, if the mobile terminal 100 is buffering data, an amount of which corresponds to being processed for one second, the proxy cache 114 may set the DRX timer to be less than the threshold, so the next data may be quickly transmitted to the mobile terminal 100. On the contrary, if the mobile terminal 100 is buffering data, an amount of which corresponds to being processed for ten seconds, the proxy cache 114 may set the DRX timer to be greater than or equal to the threshold, so the next data may be transmitted to the mobile terminal 100 at once at the time the DRX interval ends.

In addition, the proxy cache 114 may set the DRX timer taking into account the number of files to be transmitted to the mobile terminal 100.

A method of setting a DRX interval will be described in detail below with reference to FIGS. 4A and 4B.

Figure 4A:
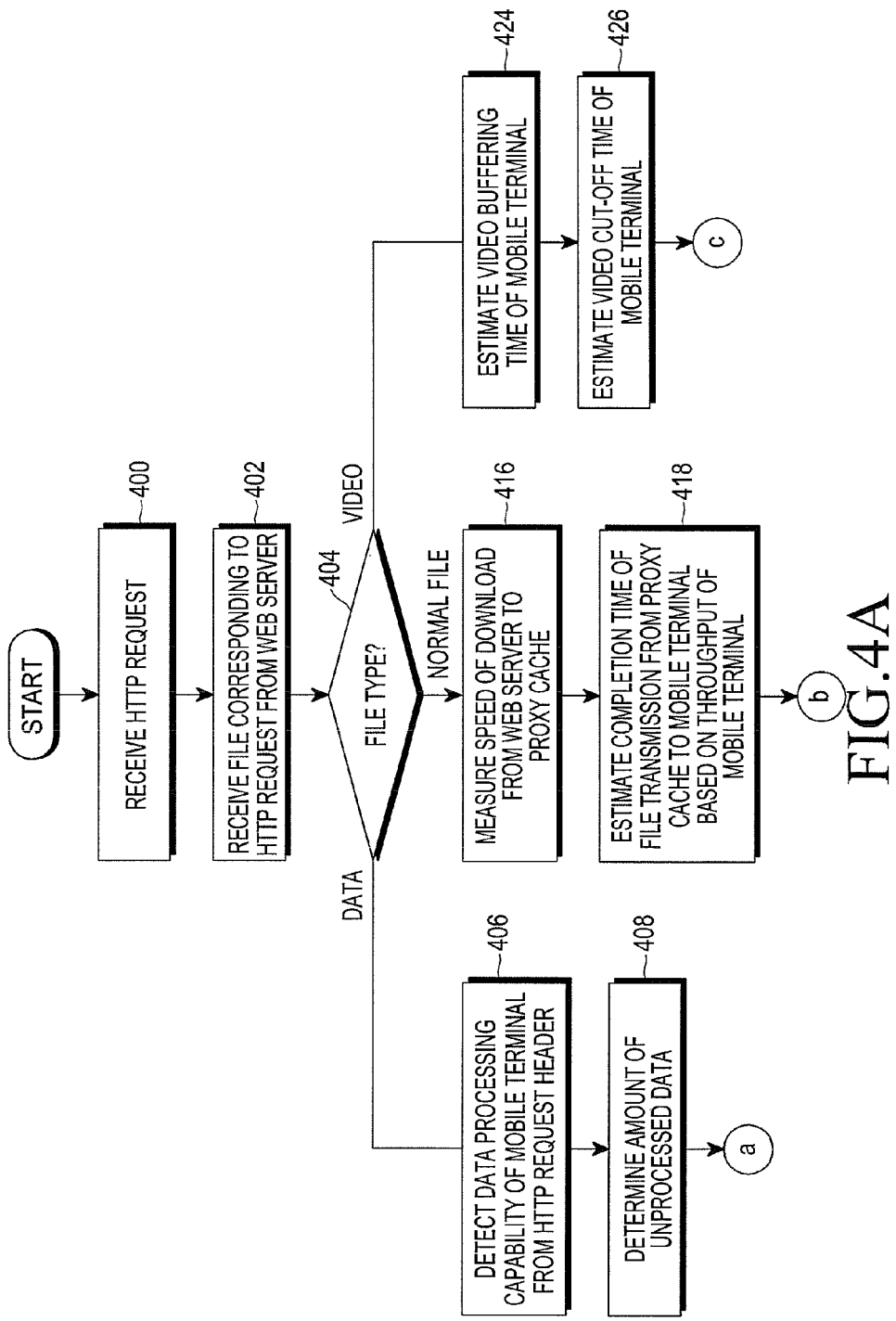
FIGS. 4A and 4B are flowcharts illustrating a process of setting a DRX interval by a proxy cache according to an exemplary embodiment of the present disclosure.
Figure 4B:
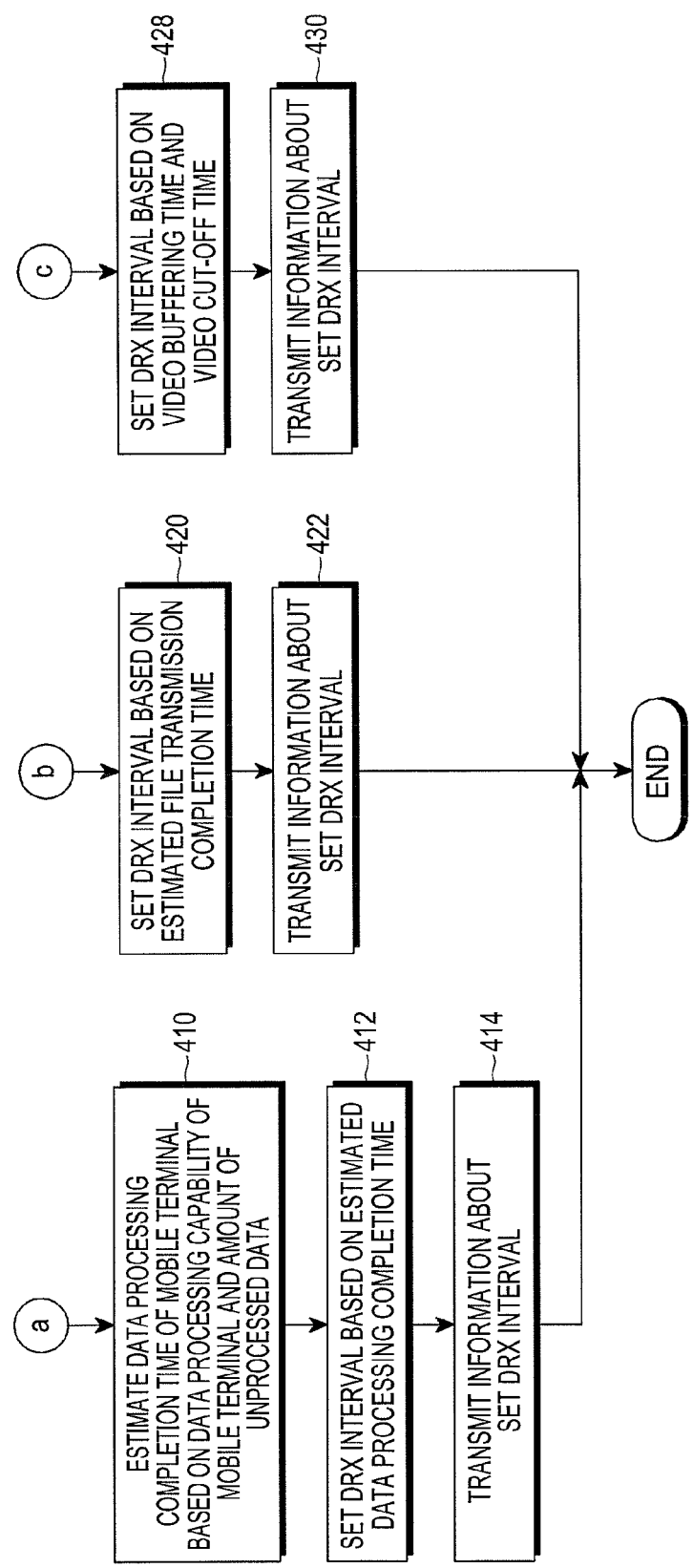

FIGS. 4A and 4B are flowcharts illustrating a process of setting a DRX interval by a proxy cache according to an exemplary embodiment of the present disclosure.

Steps 408, 418 and 426 in FIG. 4A are connected to steps 410, 420 and 428 in FIG. 4B through references 'a', 'b' and 'c', respectively. Taking this into consideration, an operation of the proxy cache 114 in FIGS. 4A and 4B will be described as follows.

In step 400, the proxy cache 114 may receive an HTTP request sent from the mobile terminal 100, via the base station 112. In step 402, the proxy cache 114 may receive a file corresponding to the HTTP request from the web server 116. In step 404, the proxy cache 114 may determine a type of the received file. For example, the proxy cache 114 may determine whether the received file corresponds to the data that needs to be processed in the mobile terminal 100; to the normal file that does not need separate processing, such as images; or to video.

The proxy cache 114 may determine the type of the file based on the URL information included in the HTTP request. In addition, the proxy cache 114 may determine the type of the file based on the header (in the case of an image or video file, its file header may be interpreted) of a file downloaded from the web server 116, the HTTP response header, or the like.

If the received file corresponds to the data that needs to be processed in the mobile terminal 100, the proxy cache 114 may detects the data processing capability of the mobile terminal 100, which is included in the HTTP request's header in step 406. Subsequently, in step 408, the proxy cache 114 may determine the amount of data that is not processed in the mobile terminal 100. The proxy cache 114 may determine the amount of data that is not processed in the mobile terminal 100, based on the feedback signal or the like that is received from the mobile terminal 100 and includes information about the processed data.

In step 410, the proxy cache 114 may estimate a data processing completion time of the mobile terminal 100, based on the data processing capability of the mobile terminal 100, and the amount of data that is not processed in the mobile terminal 100. In step 412, the proxy cache 114 may set a DRX interval based on the estimated data processing completion time. The proxy cache 114 may set the DRX interval based on a separate table that includes DRX timer information being specific to each data processing completion time. In step 414, the proxy cache 114 may transmit information about the set DRX interval to the base station 112, so the information about the set DRX interval may be transmitted to the mobile terminal 100.

If the received file corresponds to the normal file that does not need separate processing, such as images, the proxy cache 114 may estimate the speed of download from the web server 116 to the proxy cache 114 in step 416. In step 418, the proxy cache 114 may estimate a completion time of file transmission from the proxy cache 114 to the mobile terminal 100 based on the throughput of the mobile terminal 100.

In step 420, the proxy cache 114 may set a DRX interval based on the estimated file transmission completion time. The proxy cache 114 may set the DRX interval based on a separate table that includes DRX timer information being specific to each file transmission completion time. In step 422, the proxy cache 114 may transmit information about the set DRX interval to the base station 112, so the information about the set DRX interval may be transmitted to the mobile terminal 100.

If the received file corresponds to video, the proxy cache 114 may estimate a video buffering time of the mobile terminal 100 in step 424. In step 426, the proxy cache 114 may estimate a video cut-off time of the mobile terminal 100 based on the video buffering time. The video cut-off time represents the time, for which video is cut off as no buffered data is present in the mobile terminal 100.

In step 428, the proxy cache 114 may set a DRX interval based on the video cut-off time. The proxy cache 114 may set the DRX interval based on a separate table that includes DRX timer information being specific to each video cut-off time. In step 430, the proxy cache 114 may transmit information about the set DRX interval to the base station 112, so the information about the set DRX interval may be transmitted to the mobile terminal 100.

The above-described process of FIGS. 4A and 4B may be repeatedly performed at the time the DRX interval ends (i.e., at the time the mobile terminal 100 wakes up).

In order to provide a faster web service to the user, the mobile terminal 100, in the example of FIG. 3, needs to minimize the time between the time the mobile terminal 100 completes the reception of an HTTP response 1 and the time the mobile terminal 100 sends an HTTP request 2.

If the proxy cache 114 may have information about an HTTP request in advance, the proxy cache 114 may transmit the objects to the mobile terminal 100 even though the proxy cache 114 does not receive the HTTP request from the mobile terminal 100. This scheme of transmitting objects to the mobile terminal 100 without the HTTP request from the mobile terminal 100 is called a PUSH scheme.

In the case of a web application, if its HTML document is interpreted, multiple embedded objects may be present. Therefore, a user agent function may be included in the proxy cache 114 to make it possible to use the PUSH scheme. The proxy cache 114 may transmit information (hereinafter referred to as 'PUSH start information') indicating that the PUSH scheme will be performed, to the mobile terminal 100 by including the information in the first HTTP response. The PUSH start information may be included in the HTTP response in the form of an HTTP response tag. After sending the first HTTP response, the proxy cache 114 may PUSH (or transmit) embedded objects to the mobile terminal 100 while changing the DRX interval. Details about this will be described in detail below with reference to FIGS. 5A and 5B.

Figure 5A:
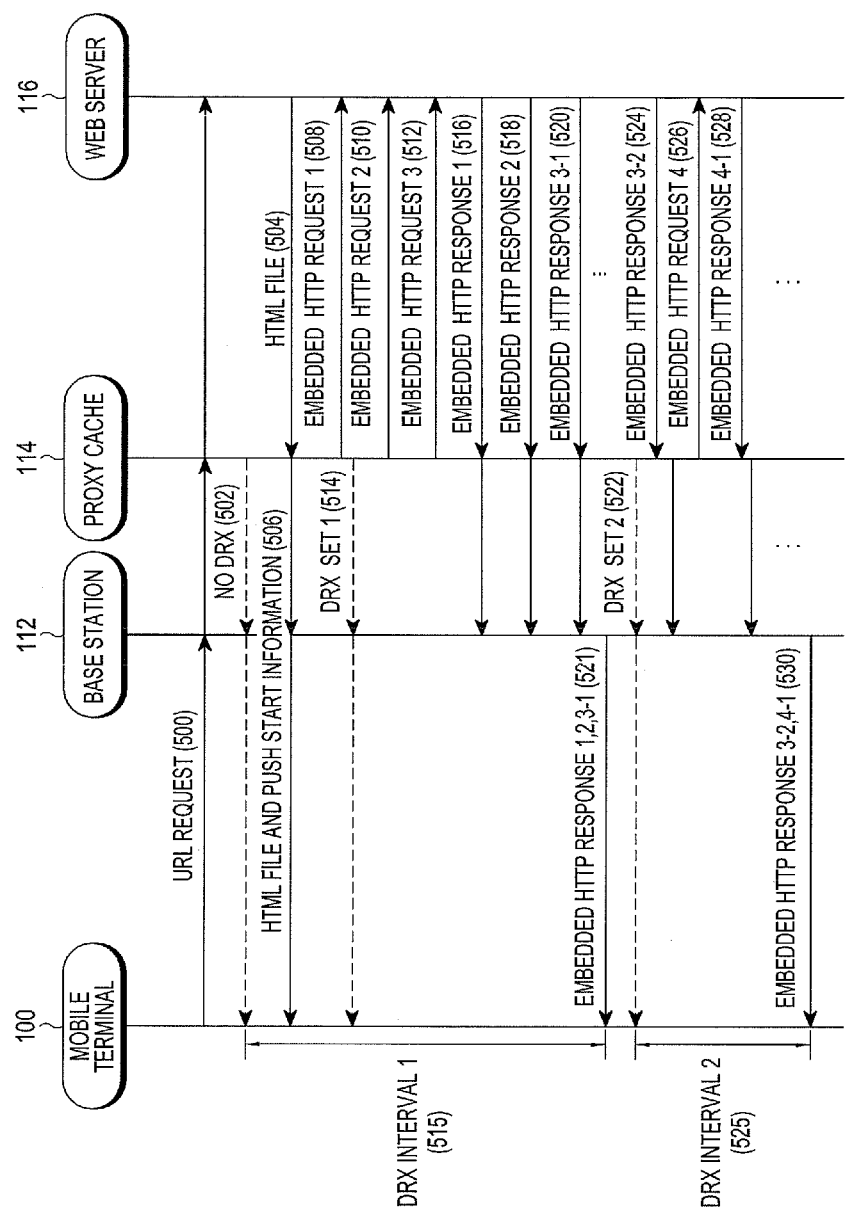
FIGS. 5A and 5B are signaling diagrams illustrating a process of performing a PUSH operation using a DRX scheme in a wireless communication system according to an exemplary embodiment of the present disclosure.
Figure 5B:
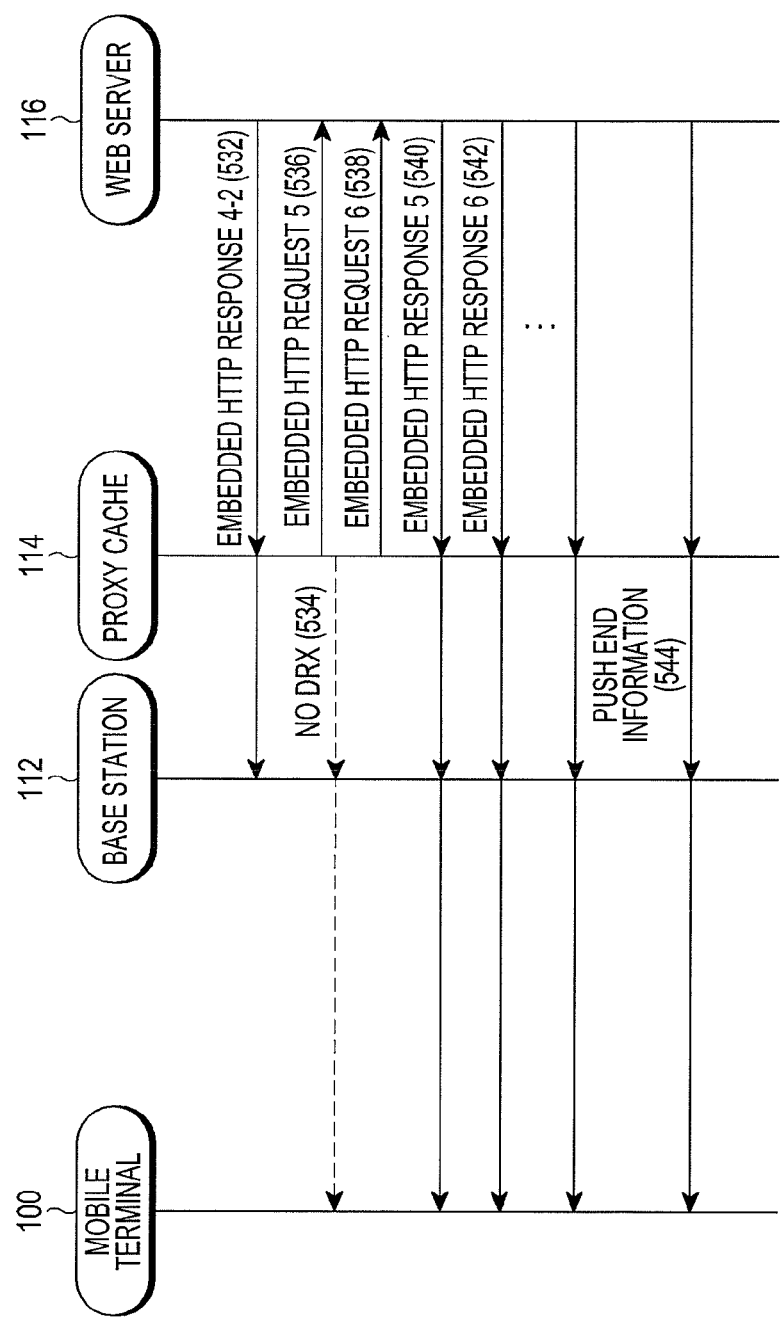

FIGS. 5A and 5B are signaling diagrams illustrating a process of performing a PUSH operation using a DRX scheme in a wireless communication system according to an exemplary embodiment of the present disclosure. The process shown in FIG. 5B is succeeding the process shown in FIG. 5A.

Referring first to FIG. 5A, the mobile terminal 100 may send a URL request to the base station 112 in step 500. The URL request may be sent to the web server 116 via the base station 112 and the proxy cache 114. Upon receiving the URL request, the proxy cache 114 may transmit information indicating that the DRX interval is not set, to the mobile terminal 100 via the base station 112 in step 502.

In step 504, the web server 116 may transmit an HTML file corresponding to the URL request to the proxy cache 114. In step 506, the proxy cache 114 may transmit PUSH start information indicating that the PUSH operation will be performed, to the base station 112 together with the HTML file. Then, the base station 112 may transmit the PUSH start information and the HTML file to the mobile terminal 100.

The proxy cache 114 may determine the presence/absence of embedded objects to be transmitted to the mobile terminal 100, by interpreting the HTML file received in step 504. If the embedded objects are present, the proxy cache 114 may send embedded HTTP requests 1, 2 and 3 for requesting the provision of the embedded objects, to the web server 116 in steps 508, 510 and 512, respectively. If the transmission of the embedded HTTP request 1 is started, the proxy cache 114 may set a first DRX interval 515. The first DRX interval 515 may be set in a way similar to that described in connection with FIGS. 4A and 4B, so a detailed description thereof will be omitted.

In step 514, the proxy cache 114 may transmit information about the set first DRX interval 515 to the base station 112. The base station 112 may transmit the information about the set first DRX interval 515 to the mobile terminal 100. Then, the mobile terminal 100 may operate in sleep mode during the first DRX interval 515 based on the information about the set first DRX interval 515.

While the mobile terminal 100 operates in sleep mode, the proxy cache 114 may receive embedded HTTP responses 1, 2 and 3-1 (a segment of an HTTP response 3) from the web server 116 in response to the embedded HTTP requests 1, 2 and 3 in steps 516, 518 and 520, respectively. The proxy cache 114 may send the embedded HTTP responses 1, 2 and 3-1 to the base station 112. In step 521, the base station 112 may send the embedded HTTP responses 1, 2 and 3-1 to the mobile terminal 100 at the time the first DRX interval 515 ends.

If the first DRX interval 515 ends, the proxy cache 114 may set a second DRX interval 525. The second DRX interval 525 may be set in a way similar to that described in connection with FIGS. 4A and 4B, so a detailed description thereof will be omitted. In step 522, the proxy cache 114 may transmit information about the set second DRX interval 525 to the base station 112. The base station 112 may transmit the information about the set second DRX interval 525 to the mobile terminal 100. Then, the mobile terminal 100 may operate in sleep mode during the second DRX interval 525 based on the information about the set second DRX interval 525.

While the mobile terminal 100 operates in sleep mode, the proxy cache 114 may perform the following operation. Specifically, in step 524, the proxy cache 114 may receive an HTTP response 3-2 (or a segment of an HTTP response 3) to be additionally transmitted to the mobile terminal 100 from the web server 116 in response to the embedded HTTP request 3. The proxy cache 114 may send the received HTTP response 3-2 to the base station 112.

In step 526, the proxy cache 114 may send an embedded HTTP request 4 to the web server 116. In step 528, the proxy cache 114 may receive an embedded HTTP response 4-1 (or a segment of an HTTP response 4) in response to the embedded HTTP request 4. The proxy cache 114 may send the received HTTP response 4-1 to the base station 112. If the second DRX interval 525 ends, the base station 112 may send the HTTP response 3-2 (or a segment of the HTTP response 3) and the HTTP response 4-1 to the mobile terminal 100 in step 530.

Referring next to FIG. 5B, the proxy cache 114 may receive an embedded HTTP response 4-2 (or a segment of the HTTP response 4) from the web server 116 and send the received embedded HTTP response 4-2 to the base station 112, in step 532. If the number of embedded HTTP responses to be sent to the mobile terminal 100 is less than a threshold, the proxy cache 114 may transmit information indicating that the DRX interval is not set, to the mobile terminal 100 via the base station 112 in step 534.

The proxy cache 114 may send embedded HTTP requests 5 and 6 to the web server 116 in steps 536 and 538, respectively, and receive embedded HTTP responses 5 and 6 in response to the embedded HTTP requests 5 and 6 in steps 540 and 542, respectively. The proxy cache 114 may send the embedded HTTP responses 5 and 6 to the base station 112. At this point, since the mobile terminal 100 does not perform the DRX operation, the base station 112 may immediately send the embedded HTTP responses 5 and 6 to the mobile terminal 100 upon the receipt of them.

If all the embedded objects included in the HTML file are transferred to the mobile terminal 100 in this way, the proxy cache 114 may transmit PUSH end information indicating that the PUSH operation will be terminated, to the mobile terminal 100 via the base station 112, in step 544. The PUSH end information, like the PUSH start information, may be transmitted by being included in an HTTP response in the form of an HTTP response tag.

Next, reference will be made to FIG. 6A to describe an operation of the proxy cache 114 in the process of FIGS. 5A and 5B.

Figure 6A:
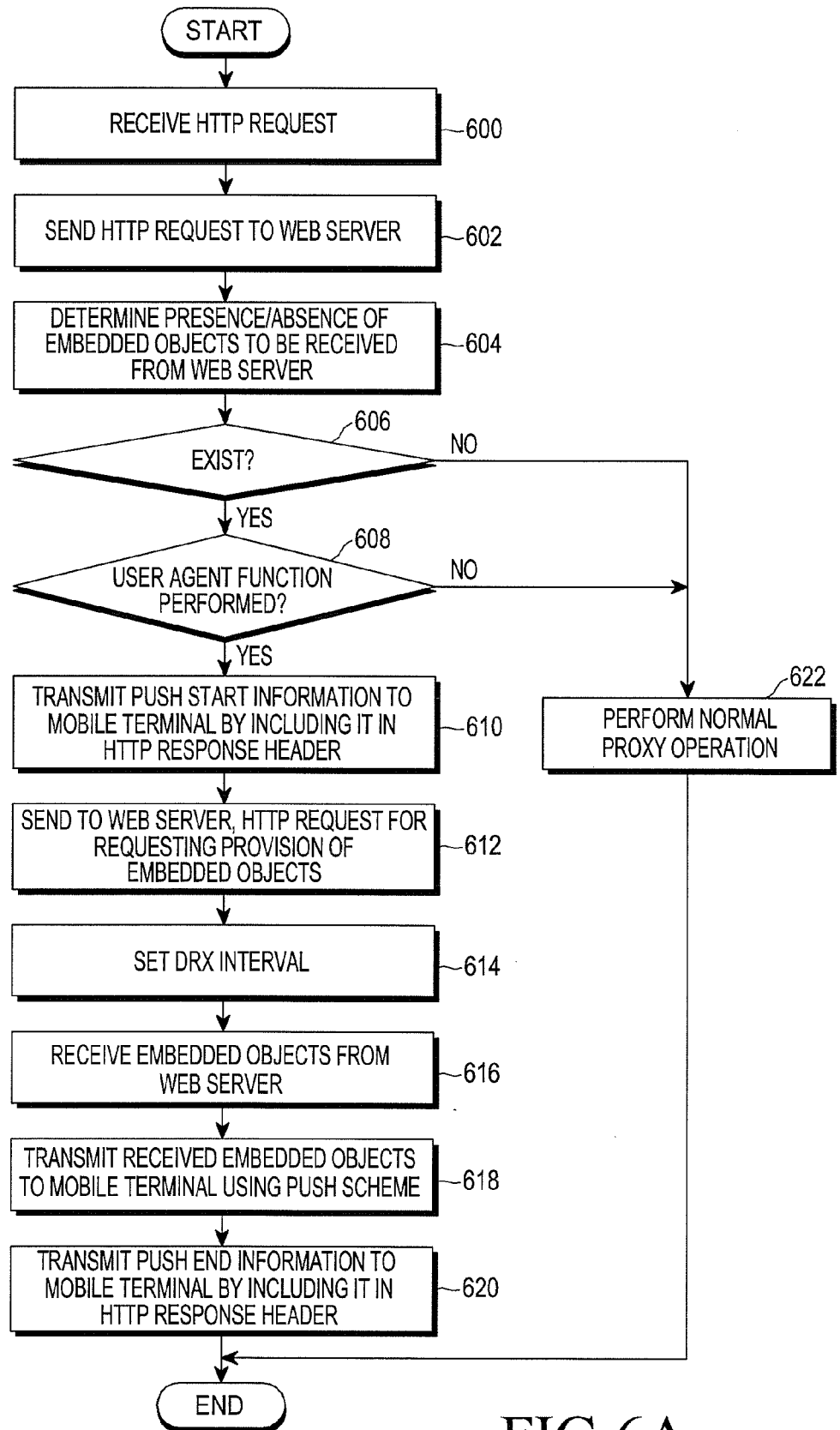
FIG. 6A is a flowchart illustrating a process of performing a PUSH operation using a DRX scheme by a proxy cache in a wireless communication system according to an exemplary embodiment of the present disclosure.

FIG. 6A is a flowchart illustrating a process of performing a PUSH operation using a DRX scheme by a proxy cache in a wireless communication system according to an exemplary embodiment of the present disclosure.

Referring to FIG. 6A, the proxy cache 114 may receive an HTTP request sent from the mobile terminal 100 in step 600. The communication between the proxy cache 114 and the mobile terminal 100 may be performed via the base station 112 as described above. The proxy cache 114 may send the HTTP request to the web server 116 in step 602, and determine in step 604 whether there are embedded objects that should be received from the web server 116 in response to the HTTP request. If it is determined in step 606 that there are no embedded objects that should be received, the proxy cache 114 may perform a normal proxy operation in step 622.

On the other hand, if it is determined in step 606 that there are embedded objects that should be received, the proxy cache 114 may determine in step 608 whether to perform a user agent function. The user agent function refers to a function of performing the operation proposed in an exemplary embodiment of the present disclosure, and may represent a function of performing, for example, the PUSH operation.

When not performing the user agent function, the proxy cache 114 may perform the normal proxy operation in step 622. In contrast, when performing the user agent function, the proxy cache 114 may transmit PUSH start information to the mobile terminal 100 by including it in an HTTP response header in step 610. In step 612, the proxy cache 114 may send an HTTP request for requesting the provision of embedded objects, to the web server 116.

In step 614, the proxy cache 114 may set a DRX interval. The proxy cache 114 may increase the DRX timer in proportion to the number of embedded objects. Specifically, if the number of embedded objects is larger than a threshold, the proxy cache 114 may increase the DRX interval by increasing the DRX timer. If the number of embedded objects is smaller than a threshold, the proxy cache 114 may decrease or release the DRX interval by reducing the DRX timer.

In another way, the proxy cache 114 may increase the DRX interval in proportion to the total file size for the embedded objects to be transmitted to the mobile terminal 100. Specifically, if the total file size is greater than a threshold, the proxy cache 114 may increase the DRX interval by increasing the DRX timer. If the total file size is less than a threshold, the proxy cache 114 may decrease or release the DRX interval by reducing the DRX timer.

In further another way, the proxy cache 114 may set the DRX interval depending on the importance (or priority) of embedded objects. Specifically, if the embedded objects to be transmitted to the mobile terminal 10 are objects with low importance such as advertisements and banners, the proxy cache 114 may increase the DRX interval by increasing the DRX timer.

After setting the DRX interval in at least one of these ways, the proxy cache 114 may transmit information about the set DRX interval to the mobile terminal 100. The proxy cache 114 may receive embedded objects from the web server 116 in step 616, and transmit the embedded objects to the mobile terminal 100 using the PUSH scheme in step 618. Specifically, the proxy cache 114 may receive embedded objects from the web server 116 without receiving an additional HTTP request from the mobile terminal 100, and perform the PUSH operation set to transmit the received embedded objects to the mobile terminal 100 at the time the DRX interval ends.

After transmitting all the embedded objects, the proxy cache 114 may transmit PUSH end information to the mobile terminal 100 by including it in an HTTP response header in step 620, exiting the user agent function.

In accordance with an exemplary embodiment of the present disclosure, the proxy cache 114 may consider increasing the number of TCP connections when performing the PUSH operation. The TCP connections may be connections between the mobile terminal 100 and the proxy cache 114, or connections between the mobile terminal 100 and the web server 116. If the number of TCP connections increases, a wider bandwidth may be used, compared to before the number of TCP connections increases. Since one TCP connection may be used to transmit only one embedded object at a time unless specific techniques are used, multiple embedded objects may be transmitted at a time, if the number of TCP connections increases. Therefore, in an exemplary embodiment of the present disclosure, the proxy cache 114 may perform the operation shown in FIG. 6B to increase the traffic throughput of the network.

Figure 6B:
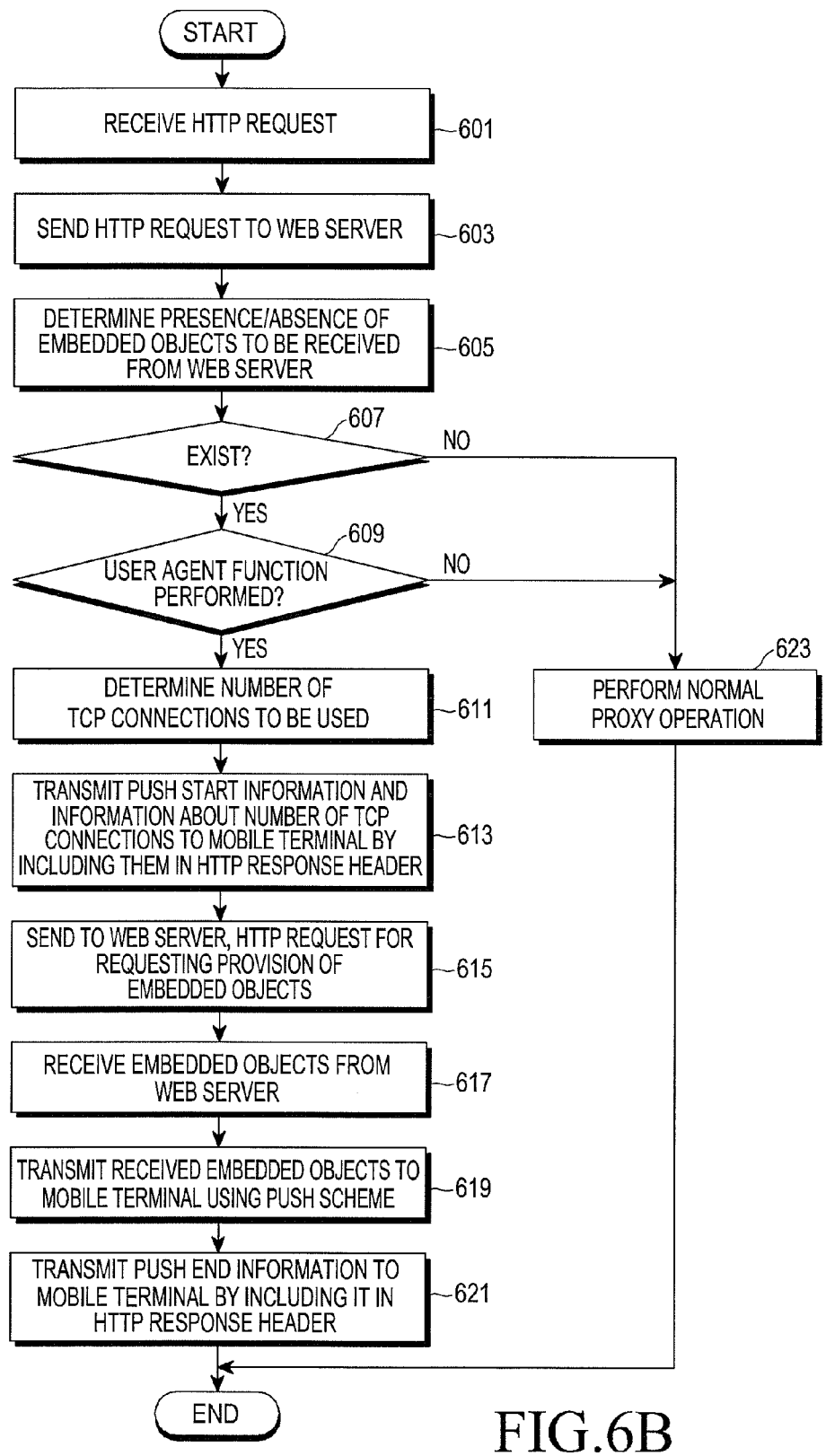
FIG. 6B is a flowchart illustrating a process of performing a PUSH operation by increasing the number of TCP connections by a proxy cache in a wireless communication system according to an exemplary embodiment of the present disclosure.

FIG. 6B is a flowchart illustrating a process of performing a PUSH operation by increasing the number of TCP connections by a proxy cache in a wireless communication system according to an exemplary embodiment of the present disclosure.

Referring to FIG. 6B, the proxy cache 114 may receive an HTTP request sent from the mobile terminal 100 in step 601. The communication between the proxy cache 114 and the mobile terminal 100 may be performed via the base station 112. The proxy cache 114 may send the HTTP request to the web server 116 in step 603, and determine in step 605 whether there are embedded objects that should be received from the web server 116 in response to the HTTP request. If it is determined in step 607 that there are no embedded objects that should be received, the proxy cache 114 may perform a normal proxy operation in step 623.

On the other hand, if it is determined in step 607 that there are embedded objects that should be received, the proxy cache 114 may determine in step 609 whether to perform a user agent function. The user agent function refers to a function of performing the operation proposed in an exemplary embodiment of the present disclosure, and may represent a function of performing, for example, the PUSH operation.

When not performing the user agent function, the proxy cache 114 may perform the normal proxy operation in step 623. In contrast, when performing the user agent function, the proxy cache 114 may determine to perform the PUSH operation. In step 611, the proxy cache 114 may determine the number of TCP connections to be used for the PUSH operation (i.e., the number of TCP connections to be used for transmission of embedded objects). The proxy cache 114 may increase the number of TCP connections to increase the throughput of the network. For example, the proxy cache 114 may increase the number of TCP connections in proportion to the number of embedded objects. Specifically, if the number of embedded objects is larger than a threshold, the proxy cache 114 may determine the number of TCP connections as a value greater than or equal to a threshold. If the number of embedded objects is less than a threshold, the proxy cache 114 may determine the number of TCP connections as a value less than a threshold.

In another way, the proxy cache 114 may increase the number of TCP connections in proportion to the total file size for the embedded objects to be transmitted to the mobile terminal 100. Specifically, if the total file size is greater than a threshold, the proxy cache 114 may fragment one file into multiple segments by increasing the number of TCP connections, and transmit each segment to the mobile terminal 100 through each of the multiple TCP connections. The segments transmitted through the multiple TCP connections may be assembled back into a single file in the mobile terminal 100. If the total file size is less than a threshold, the number of TCP connections may be determined as a value less than a threshold. The proxy cache 114 may dynamically increase or decrease the number of TCP connections. When receiving embedded objects from the web server 116, the proxy cache 114 may determine whether there is a change in the existing expected file size or the like. Based on the determination results, the proxy cache 114 may request the mobile terminal 100 to dynamically increase or decrease the number of TCP connections.

In further another way, the proxy cache 114 may determine the number of TCP connections depending on the importance (or priority) of embedded objects. Specifically, if the embedded objects to be transmitted to the mobile terminal 10 are objects with low importance such as advertisements and banners, the proxy cache 114 may determine the number of TCP connections as a value less than a threshold. If the user urgently needs to run the PUSH operation of transmitting a large number of embedded objects as sufficient buffering is not ensured during video playback, the proxy cache 114 may fragment one file into multiple segments, and transmit the segments to the mobile terminal 100 through the multiple TCP connections. In this case, the network bandwidth is expanded, contributing to an increase in transmission rate to the mobile terminal 100.

After determining the number of TCP connections in at least one of these ways, the proxy cache 114 may transmit information about the determined number of TCP connections and the PUSH start information to the mobile terminal 100 by including the information in an HTTP response header, in step 613. Then, the mobile terminal 100 may recognize that PUSH operation is started, and perform an operation of creating TCP connections, the number of which corresponds to the determined number of TCP connections.

The proxy cache 114 may additionally transmit Internet Protocol (IP) information of a replica proxy cache of the proxy cache 114 to the mobile terminal 100 by including the information in the HTTP response header. The replica proxy cache represents a proxy cache that provides a web service to the mobile terminal 100 in cooperation with the proxy cache 114. The replica proxy cache may be used if the number of mobile terminals accessing (or connected to) the proxy cache 114 is greater than or equal to a threshold, or may be used if congestion between the proxy cache 114 and the mobile terminal 100 occurs, or if there is a need to use the maximum network bandwidth by using multiple network paths. The replica proxy cache may have an IP address different from that of the proxy cache 114, and a plurality of replica proxy caches may exist.

For example, if two replica proxy caches exist and the number of TCP connections is determined as six, the proxy cache 114 may transmit information about IP addresses of first and second replica proxy caches to the mobile terminal 100 by including the information in the HTTP response header, so that the mobile terminal 100 may create any two of the total of six TCP connections based on the IP address (for example, 30.4.5.6) of the proxy cache 114, create other two of the total of six TCP connections based on the IP address (for example, 10.1.2.3) of the first replica proxy cache, and create the remaining two of the total of six TCP connections based on the IP address (for example, 20.30.40.50) of the second replica proxy cache.

Then, the mobile terminal 100 may determine that the PUSH operation is started, based on the information included in the HTTP response header, and create as many TCP connections as the determined number of TCP connections using the IP addresses of the proxy cache 114 and the first and second replica proxy caches. The proxy cache 114 transmits to the web server 116 an HTTP request for requesting provision of the embedded objects in step 615. The proxy cache 114 may receive embedded objects from the web server 116 in step 617, and transmit the embedded objects to the mobile terminal 100 using the PUSH scheme in step 619. The first and second replica proxy caches, together with the proxy cache 114, may also transmit the embedded objects to the mobile terminal 100 using the PUSH scheme. For example, the first and second replica proxy caches may transmit the embedded objects designated by the proxy cache 114 to the mobile terminal 100 using the PUSH scheme. The embedded objects may be transmitted using TCP connections, the number of which corresponds to the number of TCP connections, so the mobile terminal 100 may receive a web service more quickly.

After transmitting all the embedded objects, the proxy cache 114 may transmit PUSH end information to the mobile terminal 100 by including the information in an HTTP response header in step 621, exiting the user agent function.

Figure 7A:
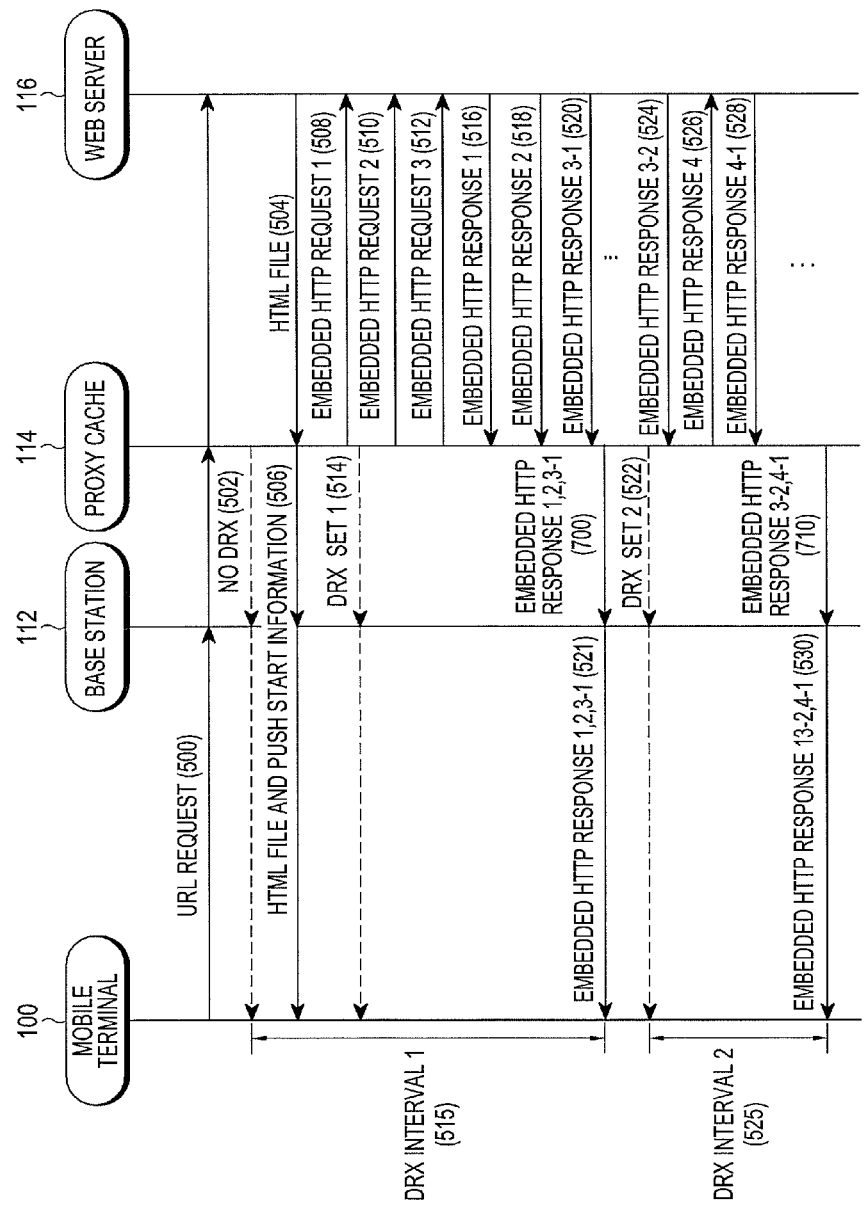
FIGS. 7A and 7B are signaling diagrams illustrating another process of performing a PUSH operation using a DRX scheme in a wireless communication system according to an exemplary embodiment of the present disclosure.
Figure 7B:
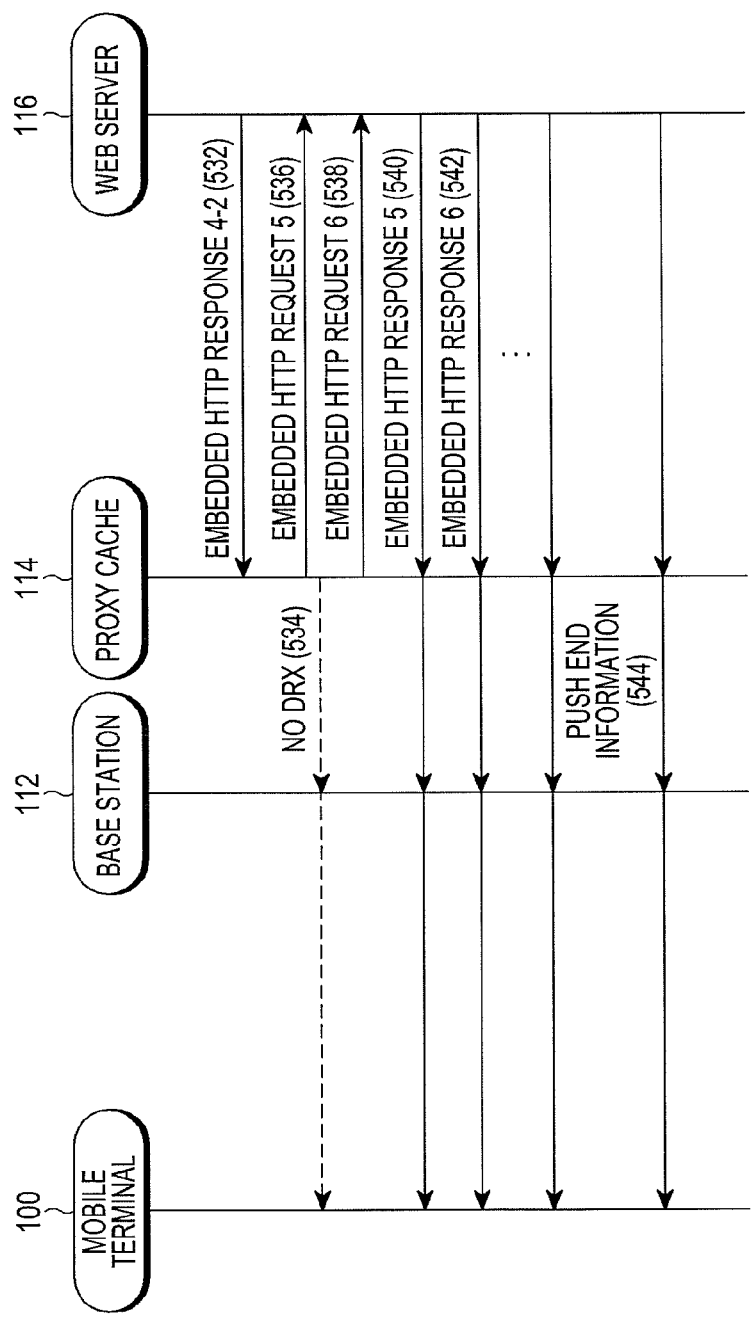

FIGS. 7A and 7B are signaling diagrams illustrating another process of performing a PUSH operation using a DRX scheme in a wireless communication system according to an exemplary embodiment of the present disclosure.

In FIGS. 7A and 7B, the remaining process except for the process between the base station 112 and the proxy cache 114 is the same as the process shown in FIGS. 5A and 5B, so a detailed description thereof will be omitted. In FIGS. 7A and 7B, similarly to an operation in which the base station 112 sends an HTTP response to the mobile terminal 100, the proxy cache 114 may send multiple HTTP responses to the base station 112 at once, taking into account the time the DRX interval ends.

Specifically, in step 700, the proxy cache 114 may send embedded HTTP responses 1, 2 and 3-1 received from the web server 116 to the base station 112 by tying them taking into account the time the first DRX interval 515 ends. In step 710, the proxy cache 114 may send embedded HTTP responses 3-2 and 4-1 received from the web server 116 to the base station 112 by tying them taking into account the time the second DRX interval 525 ends.

In order to transmit multiple HTTP responses at once in this manner, a large-volume memory is required. Since the proxy cache 114 may use a large-volume memory such as hard disk, the proxy cache 114 is suitable to perform the operation of transmitting multiple HTTP responses at once as illustrated in FIGS. 7A and 7B.

Figure 8:
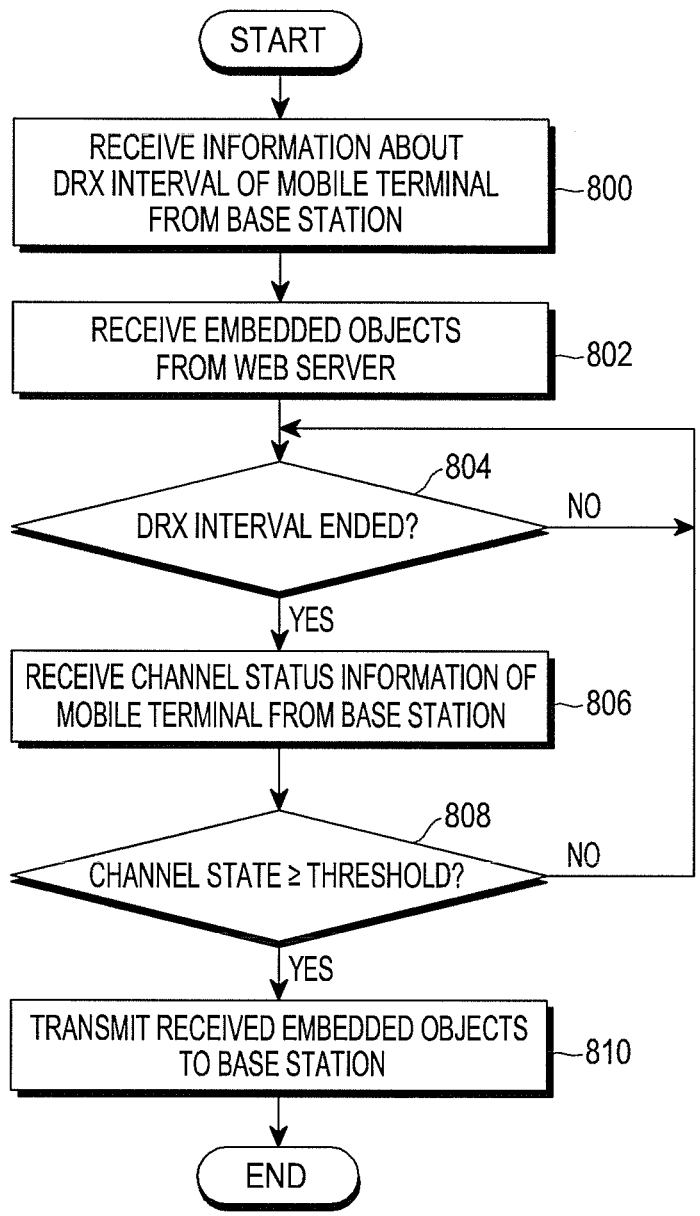
FIG. 8 is a flowchart illustrating another process of performing a PUSH operation using a DRX scheme by a proxy cache in a wireless communication system according to an exemplary embodiment of the present disclosure.

Reference will now be made to FIG. 8 to describe an operation of the proxy cache 114 in the process of FIGS. 7A and 7B.

FIG. 8 is a flowchart illustrating another process of performing a PUSH operation using a DRX scheme by a proxy cache in a wireless communication system according to an exemplary embodiment of the present disclosure.

Referring to FIG. 8, the proxy cache 114 may receive information about a DRX interval (or a DRX timer) of the mobile terminal 100 from the base station 112 in step 800. As described above, as for a DRX interval, the proxy cache 114 may determine the DRX interval and transmit its information to the base station 112. However, because it is not guaranteed that the base station 112 uses the DRX interval as it is (for example, the DRX interval may be set as a different value, if the base station 112 is transmitting video call traffic), the proxy cache 114 may receive information about the DRX interval of the mobile terminal 100 from the base station 112.

The proxy cache 114 may receive embedded objects from the web server 116 in step 802, and determine in step 804 whether the DRX interval ends. If the DRX interval ends, the proxy cache 114 may receive channel state information of the mobile terminal 100 from the base station 112 in step 806. Based on the received channel state information, the proxy cache 114 may determine in step 808 whether a channel state of the mobile terminal 100 is greater than or equal to a threshold.

If the channel state of the mobile terminal 100 is greater than or equal to the threshold, the proxy cache 114 may transmit the received embedded objects to the base station 112 in step 810. In contrast, if the channel state of the mobile terminal 100 is less than the threshold, the proxy cache 114 may return to step 804 and determine an end time of the next DRX interval.

As illustrated in FIG. 8, in the case where the channel state of the mobile terminal 100 is still poor even at the end time of the DRX interval, if the proxy cache 114 waits for the end time of the next DRX interval without transmitting the embedded objects, the resource efficiency may increase. For example, in the case where the embedded objects correspond to video, the proxy cache 114 may perform a frame transmission operation based on the buffer capacity of the mobile terminal 100, since the proxy cache 114 may determine or check frame information for the video.

If a frame, a value of which is greater than or equal to a preset value, has been buffered in a buffer of the mobile terminal 100, the proxy cache 114 may perform the frame transmission operation only if the channel state of the mobile terminal 100 is good. In contrast, if a frame, a value of which is less than a preset value, has been buffered in the buffer of the mobile terminal 100, it is preferable for the proxy cache 114 to perform the frame transmission operation even though the channel state of the mobile terminal 100 is poor.

The operation of skipping transmission of embedded objects in the DRX interval taking into account the channel state of the mobile terminal 100 may be performed under conditions that the web service (for example, a video service) being provided in the mobile terminal 100 is not interrupted, and may be performed differently depending on the following situations.

(1) The proxy cache 114 may skip transmission of embedded objects, if the channel state of the mobile terminal 100 is poor even at the end time of the DRX interval.

(2) In the case of video, in the case where the buffer capacity of the mobile terminal 100, which is determined considering the playtime, is lower than a threshold (for example, the buffer capacity corresponds to the capacity available for playback for one second), the proxy cache 114 may transmit the embedded objects even though the channel state of the mobile terminal 100 is poor. In contrast, in the case where the buffer capacity of the mobile terminal 100, which is determined considering the playtime, is greater than a threshold (for example, the buffer capacity corresponds to the capacity available for playback for ten seconds), the proxy cache 114 may skip transmission of embedded objects if the channel state of the mobile terminal 100 is poor, and transmit the embedded objects if the channel state of the mobile terminal 100 is good.

(3) During transmission of embedded objects, if it is determined that the remaining transmission completion time is shorter than a threshold, the proxy cache 114 may transmit the embedded objects even though the channel state of the mobile terminal 100 is poor, thereby preventing the transmission completion time from being delayed.

(4) If the proxy cache 114 has information about the processing capability of the mobile terminal 100, the proxy cache 114 may estimate the time required for processing specific files. Therefore, if the mobile terminal 100 is buffering a file, the remaining part of which corresponds to an amount that is to be processed for, for example, one second, the proxy cache 114 may transmit the embedded objects even though the channel state of the mobile terminal 100 is poor. If the mobile terminal 100 is buffering a file, the remaining part of which corresponds to an amount that is to be processed for, for example, ten seconds, the proxy cache 114 may skip transmission of the embedded objects if the channel state of the mobile terminal 100 is poor, and transmit the embedded objects if the channel state becomes good.

Figure 9:
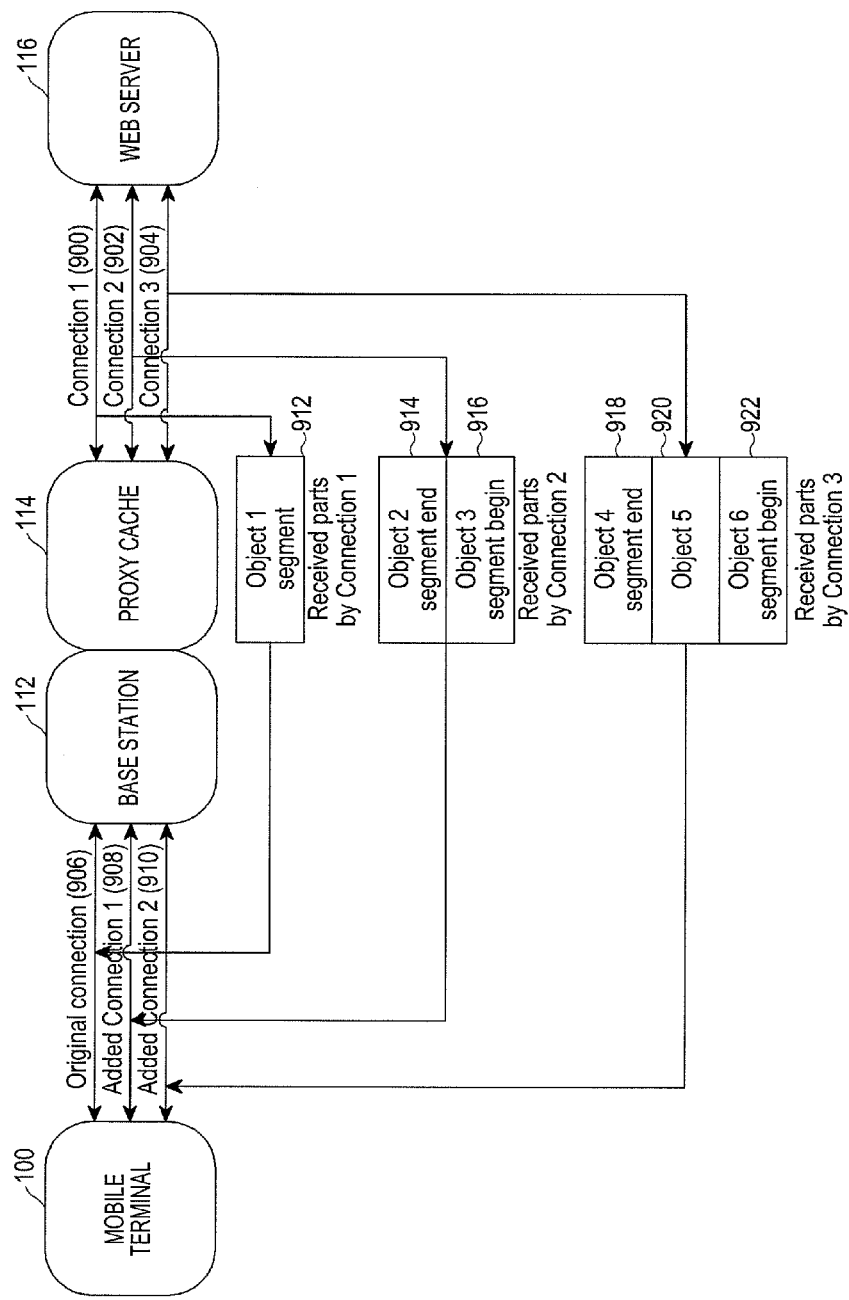
FIG. 9 illustrates a PUSH scheme that uses multiple connections established between a proxy cache and a mobile terminal according to an exemplary embodiment of the present disclosure.

FIG. 9 illustrates a PUSH scheme that uses multiple connections established between a proxy cache and a mobile terminal according to an exemplary embodiment of the present disclosure.

Referring to FIG. 9, in the case where the proxy cache 114 performs communication with the web server 116 using three connections (for example, a connection_1 900, a connection_2 902 and a connection_3 904), and only one connection (or an original connection 906) is used between the proxy cache 114 and the mobile terminal 100, a multiplexing process needs to be performed in order to transmit the objects received from the web server 116 to the mobile terminal 100. However, if connections (for example, an added connection_1 908 and an added connection_2 910), the number of which corresponds to the number of connections between the proxy cache 114 and the web server 116, are added between the proxy cache 114 and the mobile terminal 100, the proxy cache 114 may transmit the objects received from the web server 116 to the mobile terminal 100 without the multiplexing process.

Since the proxy cache 114 informs the mobile terminal 100 of its execution of the user agent function, the mobile terminal 100 may create multiple connections in advance. Specifically, the proxy cache 114 may transmit information for instructing to create multiple connections to the mobile terminal 100 at the time the proxy cache 114 informs the mobile terminal 100 of its execution of the user agent function.

In other words, the proxy cache 114 may transmit the PUSH start information and the information for instructing to create multiple connections to the mobile terminal 100 by including the information in the HTTP response header. The information for instructing to create multiple connections may include information about the number of connections to be created in the mobile terminal 100, and may be included in the HTTP response header in the form of a tag.

Upon receiving the HTTP response information including the PUSH start information and the information for instructing to create multiple connections, the mobile terminal 100 may perform an operation of creating multiple connections depending on the received information. It is shown in FIG. 9 that a total of, for example, three connections are created between the mobile terminal 100 and the proxy cache 114 as two connections (the added connection_1 908 and the added connection_2 910) are added in addition to the original connection 906 that was used basically.

If the three connections are created as above, the three connections (the connection_1 900, the connection_2 902 and the connection_3 904) between the proxy cache 114 and the web server 116 may be used to correspond to the three connections (the original connection 906, the added connection_1 908 and the added connection_2 910) between the proxy cache 114 and the mobile terminal 100, respectively, on a one-to-one basis.

Specifically, an object 1's segment (or a segment of the object 1) 912 that is received at the proxy cache 114 through the connection_1 900 may be transmitted to the mobile terminal 100 through the original connection 906. The object 2's segment end (or the last segment of the object 2) 914 and the object 3's segment begin (or the beginning segment of the object 3) 916, which are received at the proxy cache 114 through the connection_2 902, may be transmitted to the mobile terminal 100 through the added connection_1 908. The object 4's segment end 918, the object 5's segment 920, and the object 6's segment begin 922, which are received at the proxy cache 114 through the connection_3 904, may be transmitted to the mobile terminal 100 through the added connection_2 910.

Figure 10A:
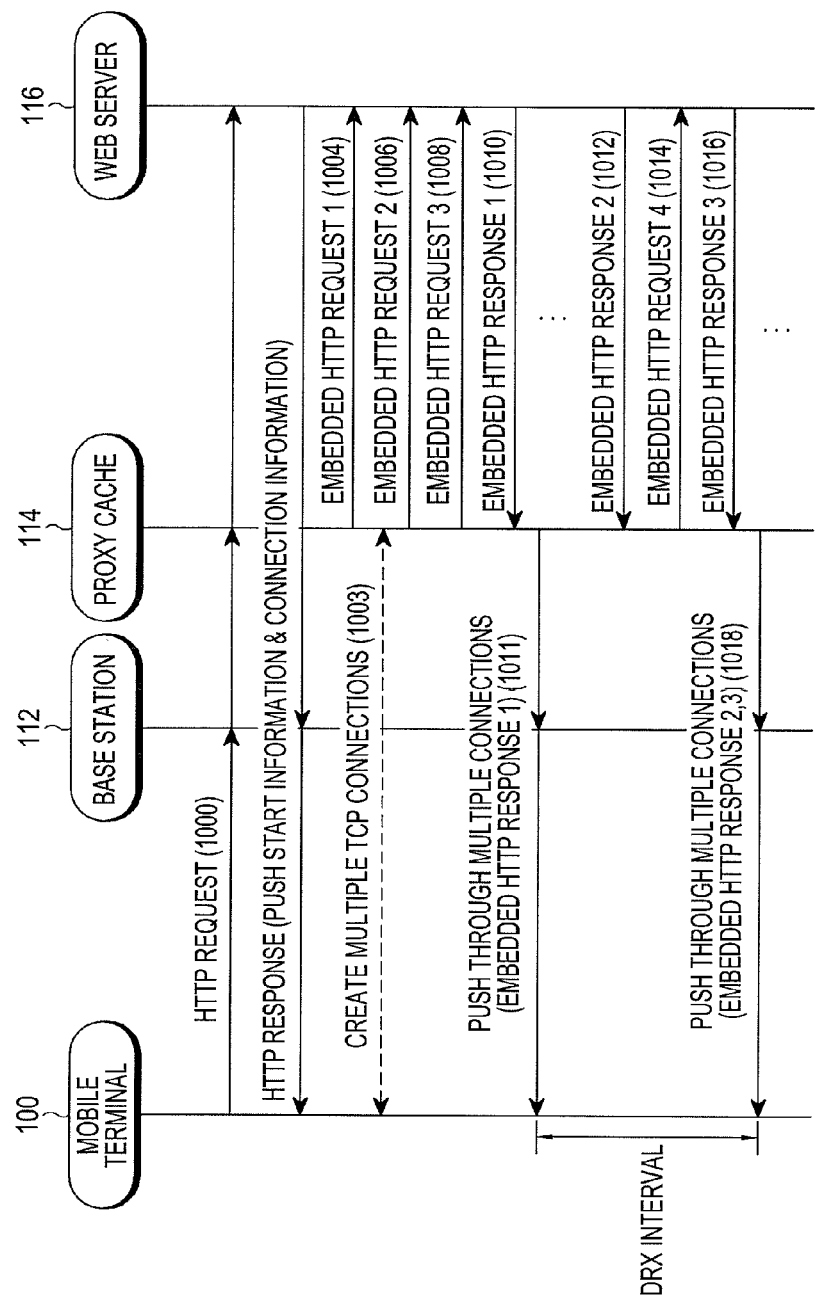
FIGS. 10A and 10B are signaling diagrams illustrating a process of creating multiple connections between a mobile terminal and a proxy cache according to an exemplary embodiment of the present disclosure.
Figure 10B:
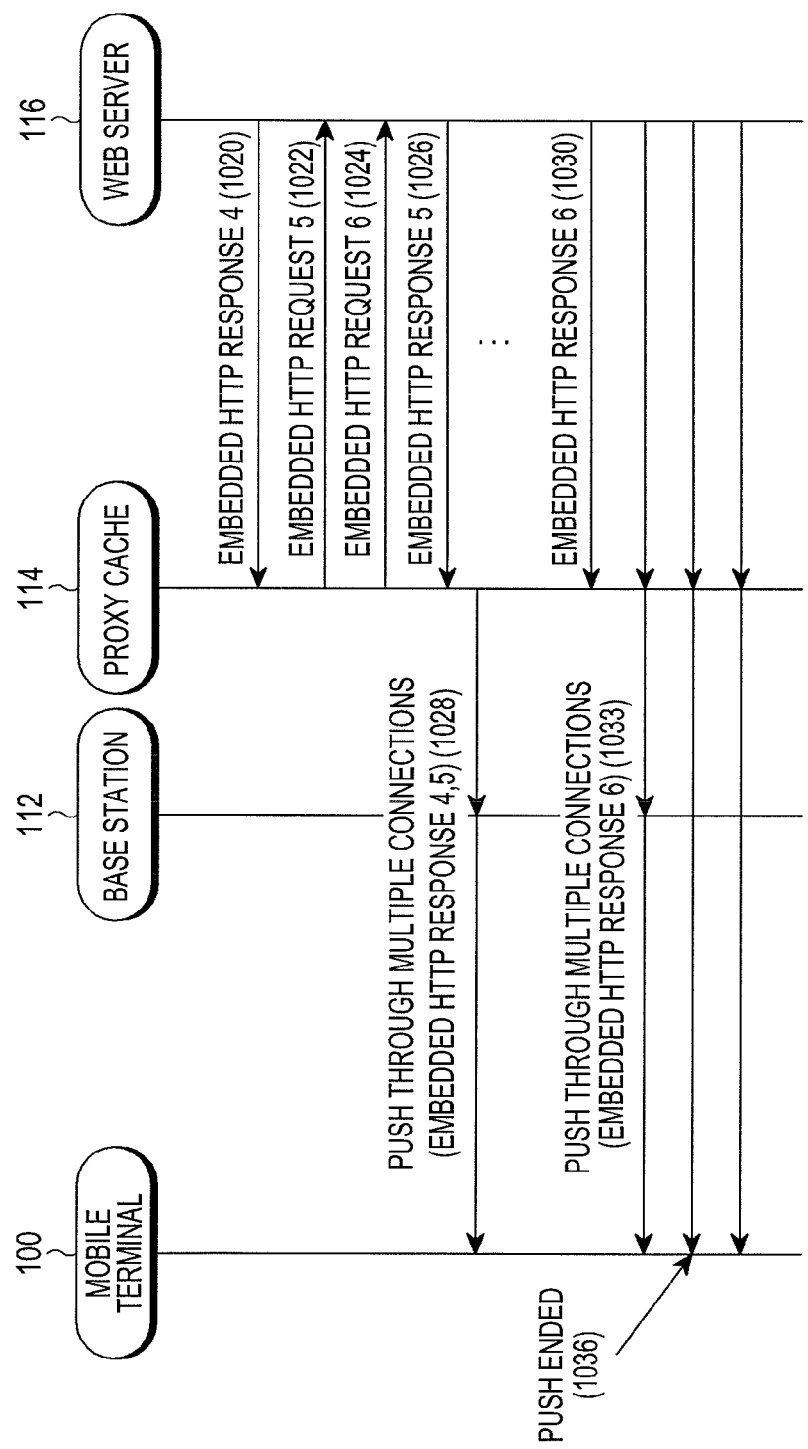

FIGS. 10A and 10B are signaling diagrams illustrating a process of creating multiple connections between a mobile terminal and a proxy cache according to an exemplary embodiment of the present disclosure. The process shown in FIG. 10B is succeeding the process shown in FIG. 10A.

Referring first to FIG. 10A, the mobile terminal 100 may send an HTTP request to the base station 112 in step 1000. Then, the base station 112 may send the HTTP request to the proxy cache 114, and the proxy cache 114 may send the HTTP request to the web server 116.

Upon receiving an HTTP response from the web server 116, the proxy cache 114 may transmit PUSH start information and connection information for instructing to create multiple connections, to the base station 112 by including the information in the HTTP response header in step 1002. The base station 112 may transmit the HTTP response with a header including the PUSH start information and the connection information, to the mobile terminal 100.

Since the connection information includes information about the number of connections to be created, the mobile terminal 100 may perform an operation of creating multiple connections based on the information about the number of connections, in step 1003. The operation of creating multiple connections is similar to the normal operation of creating TCP connections, so a detailed description thereof will be omitted.

The multiple connections created between the mobile terminal 100 and the proxy cache 114 may be the same as the connections between the proxy cache 114 and the web server 116, in terms of the number. The reason is that if connections between units are used to correspond to other connections between units on a one-to-one basis, the traffic transmission/reception efficiency may increase.

The proxy cache 114 may determine the presence/absence of embedded objects that the proxy cache 114 needs to request from the web server 116 in response to the HTTP request. If there are embedded objects that the proxy cache 114 needs to request from the web server 116 in response to the HTTP request, the proxy cache 114 may send embedded HTTP requests 1, 2 and 3 for requesting the provision of the embedded objects, to the web server 116 in steps 1004, 1006 and 1008, respectively.

In step 1010, the proxy cache 114 may receive an embedded HTTP response 1 corresponding to the embedded HTTP request 1, from the web server 116. In step 1011, the proxy cache 114 may perform a PUSH operation through multiple connections, so that the embedded HTTP response 1 may be sent to the mobile terminal 100. As described above, the PUSH operation may be performed according to the DRX interval.

During the DRX interval, the proxy cache 114 may receive an embedded HTTP response 2 corresponding to the embedded HTTP request 2 from the web server 116 in step 1012. The proxy cache 114 may send an embedded HTTP request 4 to the web server 116 in step 1014, and receive an embedded HTTP response 3 corresponding to the embedded HTTP request 3 from the web server 116 in step 1016. Subsequently, in step 1018, the proxy cache 114 may perform the PUSH operation through multiple connections, so that the embedded HTTP responses 2 and 3 may be sent to the mobile terminal 100 at the time the DRX interval ends.

Referring next to FIG. 10B, during the next DRX interval, the proxy cache 114 may receive an embedded HTTP response 4 corresponding to the embedded HTTP request 4 from the web server 116 in step 1020, and send embedded HTTP requests 5 and 6 to the web server 116 in steps 1022 and 1024, respectively. Subsequently, in step 1026, the proxy cache 114 may receive an embedded HTTP response 5 corresponding to the embedded HTTP request 5 from the web server 116. In step 1028, the proxy cache 114 may perform the PUSH operation through multiple connections, so that the embedded HTTP responses 4 and 5 may be sent to the mobile terminal 100 at the time the DRX interval ends.

During the next DRX interval, the proxy cache 114 may receive an embedded HTTP response 6 corresponding to the embedded HTTP request 6 from the web server 116 in step 1030. In step 1032, the proxy cache 114 may perform the PUSH operation through multiple connections, so that the embedded HTTP response 6 may be sent to the mobile terminal 100 at the time the DRX interval ends.

If all the embedded objects have been transmitted to the mobile terminal 100, or if embedded objects, the number of which is less than a preset number, should be transmitted to the mobile terminal 100, PUSH end information indicating that the PUSH operation will be terminated may be included in the embedded HTTP response 6 (or a separate HTTP response). In this case, the PUSH operation may be terminated in step 1036, so HTTP responses being sent later may be immediately sent to the mobile terminal 100 regardless of the DRX interval.

Since a TCP receiving buffer has the limited capacity (for example, 64 Kb), the mobile terminal 100 may temporarily expand the TCP receiving buffer, or additionally create TCP connections, in order to receive a larger number of embedded objects at once.

Figure 11:
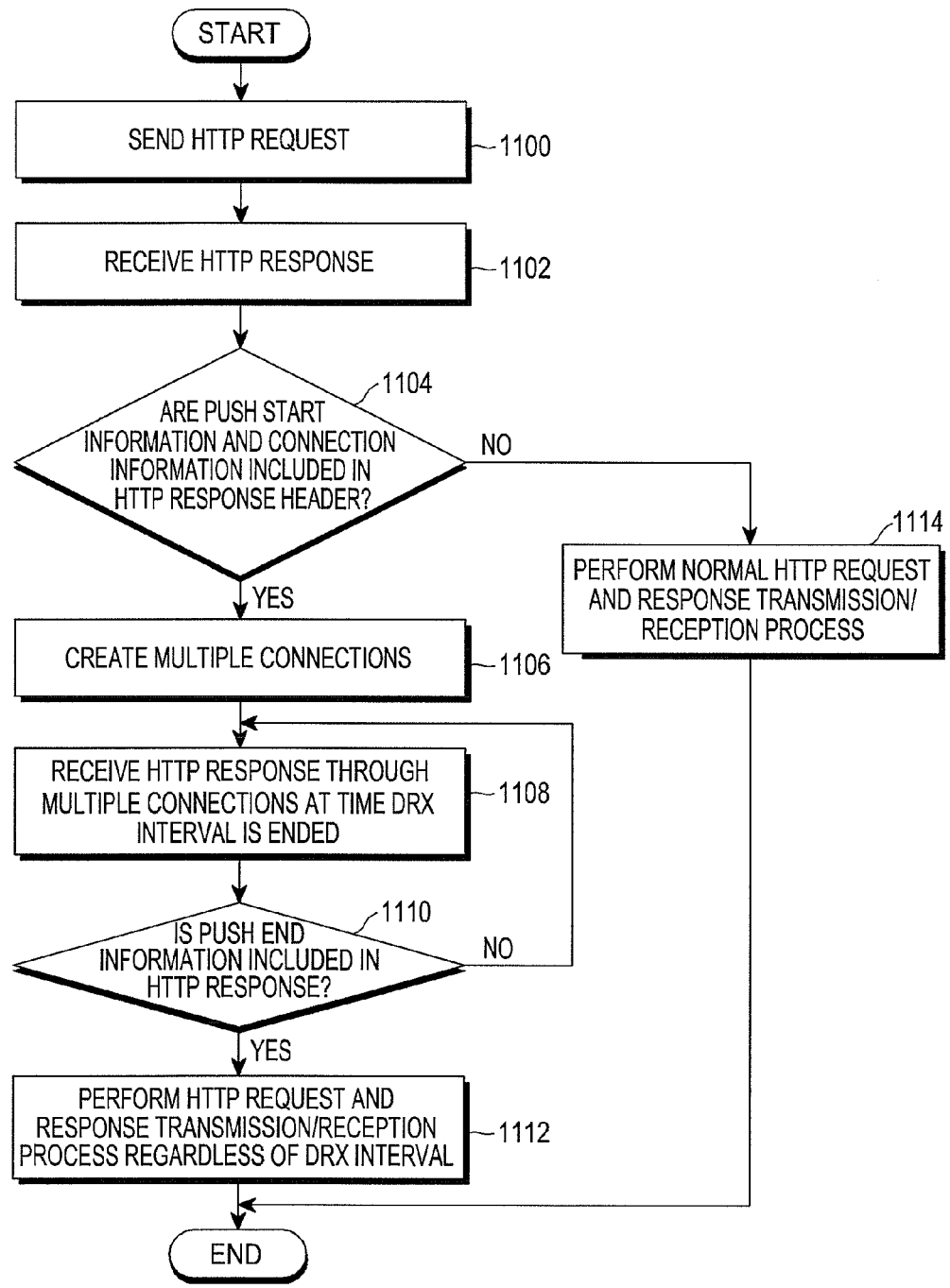
FIG. 11 is a flowchart illustrating an operation of a mobile terminal according to an exemplary embodiment of the present disclosure.

FIG. 11 is a flowchart illustrating an operation of a mobile terminal according to an exemplary embodiment of the present disclosure.

Referring to FIG. 11, the mobile terminal 100 may send an HTTP request to the base station 112 in step 1100. The mobile terminal 100 may receive an HTTP response from the base station 112 in step 1102, and determine in step 1104 whether PUSH start information and connection information are included in an HTTP response header.

If the PUSH start information and connection information are not included in the HTTP response header, the mobile terminal 100 may perform a normal HTTP request and response transmission/reception process in step 1114. In contrast, if the PUSH start information and connection information are included in the HTTP response header, the mobile terminal 100 may create multiple connections in step 1106. Specifically, the mobile terminal 100 may create as many additional connections as the number of connections, information about which is included in the connection information. In step 1108, the mobile terminal 100 may receive HTTP responses through the multiple connections at the time the DRX interval ends.

Subsequently, the mobile terminal 100 may determine in step 1110 whether PUSH end information is included in the HTTP response. If the PUSH end information is included in the HTTP response, the mobile terminal 100 may send and receive HTTP requests and responses regardless of the DRX interval in step 1112.

Figure 12:
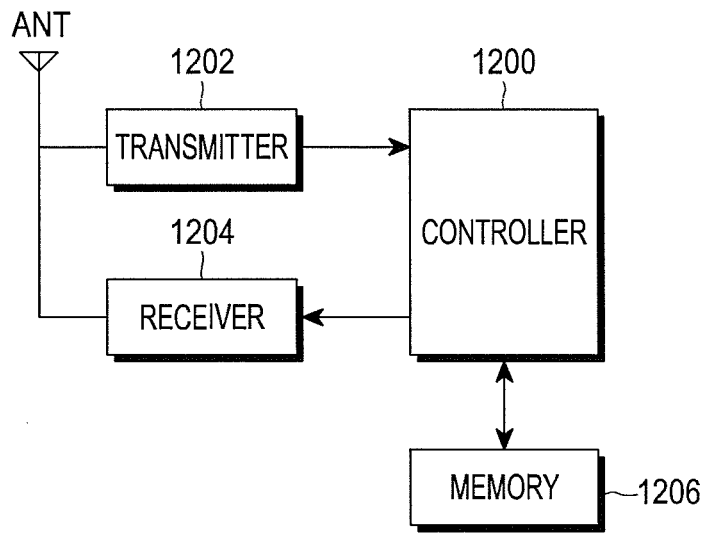
FIG. 12 is a block diagram illustrating a structure of a proxy cache according to an exemplary embodiment of the present disclosure.

FIG. 12 is a block diagram illustrating a structure of a proxy cache according to an exemplary embodiment of the present disclosure.

Referring to FIG. 12, the proxy cache 114 may include a controller 1200, a transmitter 1202, a receiver 1204, and a memory 1206.

The transmitter 1202 and the receiver 1204 may perform communication with the base station 112 and the web server 116. The memory 1206 may store a variety of information generated depending on the operation of the proxy cache 114, and store signals which are transmitted and received.

The controller 1200 may control the transmitter 1202, the receiver 1204 and the memory 1206. In particular, the controller 1200 may control the components to perform the above-described operation of the proxy cache 114, which includes, for example, an operation of setting a DRX interval, a PUSH operation (or a user agent function), and an operation of allowing the mobile terminal 100 to create multiple connections.

Figure 13:
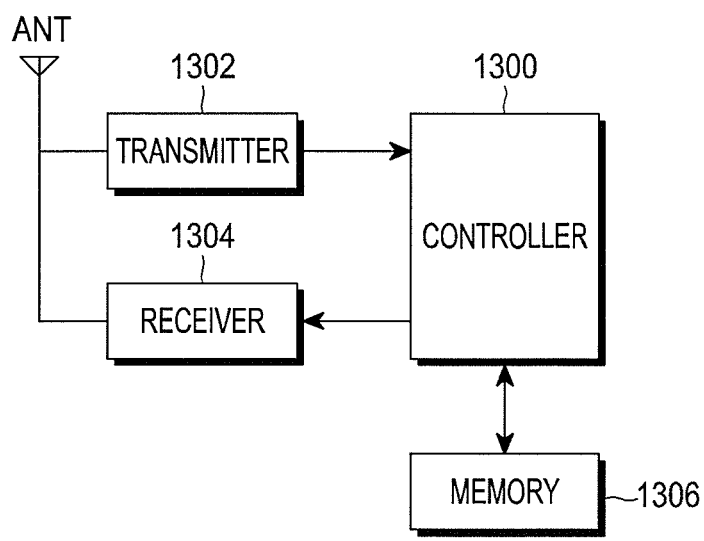
FIG. 13 is a block diagram illustrating a structure of a mobile terminal according to an exemplary embodiment of the present disclosure.

FIG. 13 is a block diagram illustrating a structure of a mobile terminal according to an exemplary embodiment of the present disclosure.

Referring to FIG. 13, the mobile terminal 100 may include a controller 1300, a transmitter 1302, a receiver 1304 and a memory 1306.

The transmitter 1302 and the receiver 1304 may perform communication with the base station 112. The memory 1306 may store a variety of information generated depending on the operation of the mobile terminal 100, and store signals which are transmitted and received.

The controller 1300 may control the transmitter 1302, the receiver 1304 and the memory 1306. In particular, the controller 1300 may control the components to perform the above-described operation of the mobile terminal 100, which includes, for example, an operation of changing its operation mode depending on the DRX interval, and an operation of creating multiple connections.

In accordance with the above-described exemplary embodiment of the present disclosure, the mobile terminal may receive a faster web service while minimizing its battery power consumption. If the proxy cache performs a user agent function, the mobile terminal may receive multiple HTTP responses at once as the PUSH operation is performed, thereby contributing to the improvement of the transmission efficiency. The proxy cache may download web objects in advance and transmit the downloaded objects to the mobile terminal, so the user of the mobile terminal may receive a web service with the almost same performance as that of the wired network users. In addition, the problem that the receiving buffer capacity for connection of the mobile terminal is limited, may be solved by creating multiple connections between the proxy cache and the mobile terminal.

As is apparent from the foregoing description, the present disclosure may provide a faster web service to the user of the mobile terminal. Therefore, the user of the mobile terminal may receive the web service with the almost same performance as that of the users who receive the web service over the wired network.

In addition, the present disclosure may allow the mobile terminal to efficiently use the DRX scheme, thereby minimizing the battery consumption of the mobile terminal.

Besides, the present disclosure may provide the web service based on the wireless channel information, making it possible to increase the wireless capacity.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for providing a web service by a proxy cache in a wireless communication system, the method comprising:
    receiving information associated with a web page for the web service of a mobile terminal;
    receiving at least one embedded object included in the web page from a web server; and
    setting a discontinuous reception (DRX) interval for the mobile terminal based on a size of the at least one embedded object, wherein the at least one embedded object is transmitted to the mobile terminal if a DRX timer expires based on the DRX interval.

2. The method of claim 1, wherein, before setting the DRX interval, information indicating that a PUSH operation is to be performed is transmitted to the mobile terminal, the PUSH operation being an operation that the at least one embedded object is transmitted to the mobile terminal without a reception of a request from the mobile terminal, and wherein, if the transmission of the at least one embedded object is completed, information indicating that the PUSH operation is terminated is transmitted to the mobile terminal.

3. The method of claim 1, wherein, if the information associated with the web page is received, a message for instructing to establish an additional connection between the mobile terminal and the proxy cache is transmitted to the mobile terminal, and wherein a number of connections between the mobile terminal and the proxy cache is a same as a number of connections between the proxy cache and the web server.

4. The method of claim 1, wherein the at least one embedded object is transmitted to the mobile terminal if the DRX timer expires based on channel state information received from the mobile terminal, and wherein the information associated with the web page includes uniform resource locator (URL) information for the web page.

5. A method for receiving a web service by a mobile terminal in a wireless communication system, the method comprising:
    transmitting information associated with a web page for the web service to a network entity including a proxy cache;
    receiving information associated with a discontinuous reception (DRX) timer from the network entity;
    operating in a sleep mode during an interval according to the DRX timer;
    transitioning from the sleep mode to a listening mode if the DRX timer expires; and
    receiving at least one embedded object included in the web page from the network entity, wherein the DRX timer is set based on a DRX interval, and wherein the DRX interval is determined by the network entity based on a size of the at least one embedded object.

6. The method of claim 5, further comprising:
    receiving, from the network entity, information indicating that a PUSH operation is to be performed, the PUSH operation being an operation that the at least one embedded object is transmitted to the mobile terminal without a reception of a request from the mobile terminal; and
    if the reception of the at least one embedded object is completed, receiving, from the proxy cache, information indicating that the PUSH operation is terminated.

7. The method of claim 5, further comprising:
    after transmitting the information associated with the web page, receiving, from the network entity, a message for instructing to establish an additional connection between the mobile terminal and the proxy cache, wherein a number of connections between the mobile terminal and the proxy cache is a same as a number of connections between the proxy cache and a web server.

8. The method of claim 5, wherein the receiving of the at least one embedded object comprises:
    transmitting channel state information of the mobile terminal to the network entity; and
    receiving the at least one embedded object if the DRX timer expires based on the channel state information wherein the information associated with the web page includes uniform resource locator (URL) information for the web page.

9. A proxy cache in a wireless communication system, the proxy cache comprising:
    a receiver configured to:
        receive information associated with a web page for a web service of a mobile terminal; and
        receive at least one embedded object included in the web page from a web server; and
    a processor configured to set a discontinuous reception (DRX) interval for the mobile terminal based on a size of the at least one embedded object, wherein the at least one embedded object is transmitted to the mobile terminal if a DRX timer expires based on the DRX interval.

10. The proxy cache of claim 9, wherein before setting the DRX interval, information indicating that a PUSH operation is to be performed is transmitted to the mobile terminal, the PUSH operation being an operation that the at least one embedded object is transmitted to the mobile terminal without a reception of a request from the mobile terminal, and
    wherein if the transmission of the at least one embedded object is completed, information indicating that the PUSH operation is terminated is transmitted to the mobile terminal.

11. The proxy cache of claim 9, wherein if the information associated with the web page is received, a message for instructing to establish an additional connection between the mobile terminal and the proxy cache is transmitted to the mobile terminal, and wherein a number of connections between the mobile terminal and the proxy cache is a same as a number of connections between the proxy cache and the web server.

12. The proxy cache of claim 9, wherein the at least one embedded object is transmitted to the mobile terminal if the DRX timer expires based on channel state information received from the mobile terminal, and
    wherein the information associated with the web page includes uniform resource locator (URL) information for the web page.

13. A mobile terminal in a wireless communication system, the mobile terminal comprising:
    a transceiver configured to:
        transmit information associated with a web page for a web service to a network entity including a proxy cache; and
        receive information associated with a discontinuous reception (DRX) timer from the network entity; and
    a processor configured to:
        control the mobile terminal to operate in a sleep mode during an interval according to DRX timer;
        transit from the sleep mode to a listening mode if the DRX timer expires; and
        control the transceiver to receive at least one embedded object included in the web page from the network entity, wherein the DRX timer is set based on a DRX interval, and wherein the DRX interval is determined by the network entity based on a size of the at least one embedded object.

14. The mobile terminal of claim 13, wherein the transceiver is configured to:
    receive, from the network entity, information indicating that a PUSH operation is to be performed, the PUSH operation being an operation that the at least one embedded object is transmitted to the mobile terminal without a reception of a request from the mobile terminal; and
    if the reception of the at least one embedded object is completed, receive, from the network entity, information indicating that the PUSH operation is terminated.

15. The mobile terminal of claim 13, wherein after transmitting the information associated with the web page, the processor is configured to control the transceiver to receive from the network entity a message for instructing to establish an additional connection between the mobile terminal and the network entity, and wherein a number of connections between the mobile terminal and the network entity is a same as a number of connections between the network entity and a web server.

16. The mobile terminal of claim 13, wherein the processor is configured to:

control the transceiver to:
  transmit channel state information of the mobile terminal to the network entity; and
  receive the at least one embedded object if the DRX timer expires based on the channel state information, wherein the information associated with the web page includes uniform resource locator (URL) information for the web page.

* * * * *